(12) United States Patent
Ishima et al.

(10) Patent No.: US 11,898,044 B2
(45) Date of Patent: Feb. 13, 2024

(54) INK COMPOSITION

(71) Applicant: DNP FINE CHEMICALS CO., LTD., Yokohama (JP)

(72) Inventors: Yukiko Ishima, Yokohama (JP); Fumie Yamazaki, Yokohama (JP); Ryosuke Kotani, Yokohama (JP); Ryoma Yasui, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 0 days.

(21) Appl. No.: 18/032,427

(22) PCT Filed: Oct. 29, 2021

(86) PCT No.: PCT/JP2021/040076
§ 371 (c)(1),
(2) Date: Apr. 18, 2023

(87) PCT Pub. No.: WO2022/092280
PCT Pub. Date: May 5, 2022

(65) Prior Publication Data
US 2023/0383133 A1 Nov. 30, 2023

(30) Foreign Application Priority Data

Oct. 30, 2020 (JP) ................................. 2020-183014
Oct. 30, 2020 (JP) ................................. 2020-183015

(51) Int. Cl.
*C09D 11/322* (2014.01)
*C09D 11/037* (2014.01)
*C09D 11/101* (2014.01)

(52) U.S. Cl.
CPC .......... *C09D 11/322* (2013.01); *C09D 11/037* (2013.01); *C09D 11/101* (2013.01)

(58) Field of Classification Search
CPC .... C09D 11/322; C09D 11/037; C09D 11/101
(Continued)

(56) References Cited

U.S. PATENT DOCUMENTS

2010/0221506 A1* 9/2010 Morimoto ............ C09D 11/322
522/75
2016/0347961 A1 12/2016 Kobayashi et al.
2020/0391535 A1* 12/2020 Mathew ............... B41M 5/0023

FOREIGN PATENT DOCUMENTS

JP 2012-031284 A 2/2012
JP 2012-092252 A 5/2012
(Continued)

OTHER PUBLICATIONS

Machine translation of JP 2016222820 A. (Year: 2016).*
(Continued)

*Primary Examiner* — Betelhem Shewareged
(74) *Attorney, Agent, or Firm* — Oliff PLC

(57) ABSTRACT

An active energy ray curable ink composition capable of improving curability while maintaining excellent metal-tone glossiness and a printed matter having high design properties and excellent metal-tone glossiness. The ink composition is discharged using an inkjet method, and contains a polymerization initiator, a polymerizable compound, and a brilliant pigment. The polymerization initiator contains an acylphosphine oxide-based polymerization initiator, aminoacetophenone-based polymerization initiator, and thioxanthone-based polymerization initiator. The printed matter includes a brilliant layer containing the brilliant pigment.

18 Claims, 2 Drawing Sheets

(58) Field of Classification Search
USPC ...................................................... 428/195.1
See application file for complete search history.

(56)         References Cited

FOREIGN PATENT DOCUMENTS

| | | |
|---|---|---|
| JP | 2016-169393 A | 9/2016 |
| JP | 2016-222820 A | 12/2016 |
| JP | 2017-002162 A | 1/2017 |
| JP | 2017-052870 A | 3/2017 |
| JP | 2017-155181 A | 9/2017 |
| JP | 2019-137765 A | 8/2019 |
| JP | 2019-218498 A | 12/2019 |
| JP | 2020-076030 A | 5/2020 |

OTHER PUBLICATIONS

Jul. 20, 2021 Office Action issued in Japanese Patent Application No. 2021-069826.
Nov. 24, 2021 Office Action issued in Japanese Patent Application No. 2021-069826.
Aug. 3, 2021 Office Action issued in Japanese Patent Application No. 2021-069827.
Jan. 18, 2022 Search Report issued in International Patent Application No. PCT/JP2021/040076.

\* cited by examiner

INK COMPOSITION

TECHNICAL FIELD

The present invention relates to an active energy ray curable ink composition for brilliant decoration printing to be mainly discharged by an inkjet method.

BACKGROUND ART

Conventionally, an image with a metallic tone is sometimes expressed on an adherend such as a substrate (recording medium) or a printed matter in which a colored layer is formed on a part or the whole of the surface thereof. As a method for providing such metallic gloss, for example, application of an ink including metal powders produced from brass, aluminum microparticles, or the like, foil stamping using metal foil, or heat transfer printing system using metal foil has been used.

Recently, in addition to the above-mentioned methods of forming a coating film having metallic gloss, many examples of application to inkjet system printing methods can be seen, and one of them is brilliant decoration printing. Brilliant decoration printing using an inkjet system is mainly performed using an inkjet printer or the like.

For example, Patent Document 1 discloses an ink composition containing a brilliant pigment, a predetermined amount of a radical polymerizable compound, and a polymerization initiator. Patent Document 1 describes that this ink composition has excellent curing properties and provides a printed matter having metallic gloss in which excellent flexibility and high film hardness are both achieved.

Patent Document 2 discloses an ink composition containing a predetermined brilliant pigment, an organic solvent, a photopolymerizable compound, and a photopolymerization initiator. Patent Document 2 describes that this ink composition can form a coating film having good metallic gloss.

Patent Document 1: Japanese Unexamined Patent Application, Publication No. 2012-31284

Patent Document 2: Japanese Unexamined Patent Application, Publication No. 2017-2162

DISCLOSURE OF THE INVENTION

Problems to be Solved by the Invention

Incidentally, since brilliant pigments have properties of reflecting visible light and ultraviolet light, active energy ray curable ink compositions containing brilliant pigments have a problem that curability deteriorates.

For example, it is conceivable to use an acylphosphine oxide-based polymerization initiator that absorbs a broad wavelength region in order to improve the curability. However, studies by the present inventors revealed that a mere increase in the content of a polymerization initiator improves the curability but cannot give good metallic gloss.

It is an object of the present invention to provide an active energy ray curable ink composition having improved curability while maintaining good metallic gloss.

In addition, it is an object of the present invention to provide a printed matter with high design properties to provide good metallic gloss.

Means for Solving the Problems

The present inventors have made intensive studies to solve the above problems and as a result, have found that an ink composition containing multiple types of polymerization initiators at a specific combination can solve the above problems, and have completed the present invention.

In addition, the present inventors have made intensive studies to solve the above problems and as a result, have found that a printed matter in which, when light is incident on a brilliant layer at a predetermined angle, the sum of $L^*$ values at predetermined reflection angles satisfies a predetermined relationship, can solve the above problems, and have completed the present invention. Specifically, the present invention provides the followings.

(1) An active energy ray curable ink composition to be discharged by an inkjet method, the ink composition including polymerization initiators, a polymerizable compound, and a brilliant pigment; the content of the brilliant pigment being 1.5 mass % or more with respect to the total amount of the ink composition; the content of the polymerization initiators being 10 mass % or more with respect to the total amount of the ink composition; the polymerization initiators including an acylphosphine oxide-based polymerization initiator, an aminoacetophenone-based polymerization initiator, and a thioxanthone-based polymerization initiator.

(2) The ink composition as described in aspect (1), wherein the content of the acylphosphine oxide-based polymerization initiator is 10 mass % or more and 80 mass % or less with respect to the total amount of the polymerization initiators; the content of the aminoacetophenone-based polymerization initiator is 5 mass % or more and 50 mass % or less with respect to the total amount of the polymerization initiators; and the content of the thioxanthone-based polymerization initiator is 5 mass % or more and 50 mass % or less with respect to the total amount of the polymerization initiators.

(3) The ink composition as described in aspect (2), wherein the content of the acylphosphine oxide-based polymerization initiator is 10 mass % or more and 39 mass % or less with respect to the total amount of the polymerization initiators.

(4) The ink composition as described in any one of aspects (1) to (3), wherein the brilliant pigment includes a metal-containing brilliant pigment.

(5) A recording method, including discharging an active energy ray curable ink composition by an inkjet method, the ink composition containing polymerization initiators, a polymerizable compound, and a brilliant pigment; the content of the brilliant pigment being 1.5 mass % or more; the content of the polymerization initiators being 10 mass % or more with respect to the total amount of the ink composition; and the polymerization initiators including an acylphosphine oxide-based polymerization initiator, an aminoacetophenone-based polymerization initiator, and a thioxanthone-based polymerization initiator.

(6) A manufacturing method of a printed matter, including discharging an active energy ray curable ink composition by an inkjet method, the ink composition containing polymerization initiators, a polymerizable compound, and a brilliant pigment; the content of the brilliant pigment being 1.5 mass % or more; the content of the polymerization initiators being 10 mass % or more with respect to the total amount of the ink composition; and the polymerization initiators including an acylphosphine oxide-based polymerization initiator, an aminoacetophenone-based polymerization initiator, and a thioxanthone-based polymerization initiator.

(7) A printed matter, including a brilliant layer containing a brilliant pigment, wherein when incident light is incident on the brilliant layer at an incidence angle of 45° with respect to the brilliant layer of the printed matter, L1, the total of L* values regarding a reflection angle of −15° and a reflection angle of 15° in the L*a*b* color system, is 200 or more, L2, the total of L* values regarding a reflection angle of 45°, a reflection angle of 75°, and a reflection angle of 110° in the L*a*b* color system is 100 or more, and L1−L2 is or more, provided that the angle of specular reflection light with respect to the incident light and the angle of a normal line with respect to the brilliant layer are defined as ° and 45°, respectively.

(8) An active energy ray curable ink composition to be discharged by an inkjet method, the ink composition including a polymerizable compound and a brilliant pigment, the content of the brilliant pigment being 1.0 mass % or more with respect to the total amount of the ink composition, the ink composition having a contact angle of 29.5° or more and 70.0° or less on a wet film of the ink composition.

(9) The ink composition as described in aspect (8), wherein the brilliant pigment includes a metal-containing brilliant pigment.

(10) The ink composition as described in aspect (9), wherein the metal-containing brilliant pigment has a volume-based 50% cumulative particle diameter (D50) of 0.01 μm or more and 3.0 μm or less, the metal-containing brilliant pigment has a volume-based 90% cumulative particle diameter (D90) of 4.5 μm or less, and the metal-containing brilliant pigment has a thickness of 10 nm or more and 1.0 μm or less.

(11) A recording method, including discharging the ink composition as described in any one of aspects (8) to (10) by an inkjet method.

(12) A manufacturing method of a printed matter, including discharging the ink composition according to any one of aspects (8) to (10) by an inkjet method.

Effects of the Invention

The ink composition of the present invention can improve the curability while maintaining the glossiness. In addition, according to the present invention, a printed matter having good metallic gloss can be provided.

PREFERRED MODE FOR CARRYING OUT THE INVENTION

Figure 1:
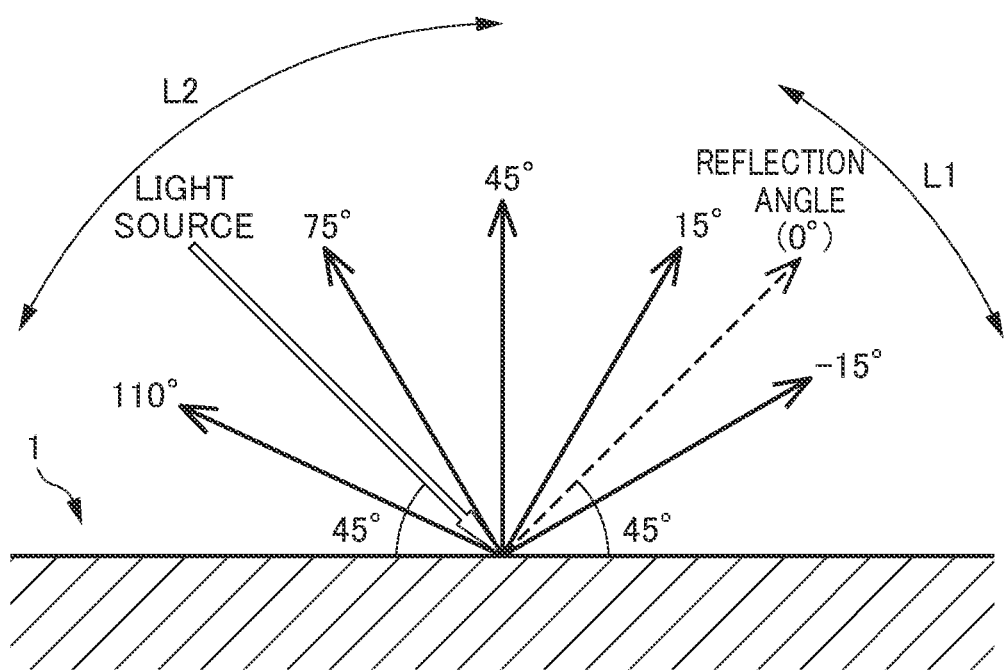
FIG. 1 is a schematic diagram showing measurement angles of L* (lightness index) in the L*a*b* color system in the glossiness evaluation in the Examples.

Specific embodiments of the present invention will now be described in detail, but the present invention is by no means limited to the following embodiments and can be implemented with appropriate modifications within the scope of the object of the present invention.

1. First Embodiment

A first embodiment of the present invention relates to an active energy ray curable ink composition, a manufacturing method of this ink composition, a printed matter obtained by using this ink composition, a recording method using this ink composition, and a manufacturing method of a printed matter using this ink composition.

<1-1. Ink Composition>

The ink composition according to the present embodiment is an active energy ray curable ink composition to be discharged by an inkjet method. This ink composition contains a polymerizable compound and a brilliant pigment and can form a brilliant layer containing the brilliant pigment on a surface of an adherend by being irradiated with active energy rays to give metallic gloss to the adherend. Incidentally, the adherend in the present specification may be the surface itself of a recording medium or may be a colored layer, a primer layer, or an overcoat layer formed on a part or the whole of the surface of the recording medium, and is thus not particularly limited. In addition, although details will be described later, the "colored layer" in the present specification means a layer containing a coloring material (dye or pigment) that is used in ordinary ink compositions and is different from the brilliant pigment.

The content of the brilliant pigment contained in the ink composition is 1.5 mass % or more. Consequently, it is possible to give good metallic gloss and also possible to improve the contrast properties of the adherend.

Since brilliant pigments have a property of reflecting visible light and ultraviolet light, an increase in the content of a brilliant pigment in an active energy ray curable ink composition causes a problem where curability deteriorates. Accordingly, the ink composition according to the present embodiment is characterized in that the content of the polymerization initiators is 10 mass % or more with respect to the total amount of the ink composition, and the polymerization initiators include an acylphosphine oxide-based polymerization initiator, an aminoacetophenone-based polymerization initiator, and a thioxanthone-based polymerization initiator. Consequently, it is possible to improve the curability of the ink composition.

Moreover, it is possible to adjust the curing rate of the ink composition appropriately by containing multiple types of polymerization initiators having absorption wavelength regions different from each other. Therefore, it is possible to suppress the inhibition of orientation of the brilliant pigment due to curing unevenness, curing shrinkage, and so on and also to maintain metallic gloss to be given to the adherend.

Each component included in the ink composition according to the present embodiment will now be described respectively.

[Brilliant Pigment]

The brilliant pigment has a function of giving metallic gloss to an adherend. Examples of the brilliant pigment includes those containing a pearl pigment or a metal-containing brilliant pigment. In particular, the brilliant pigment preferably includes a metal-containing brilliant pigment. The metal-containing brilliant pigment can give more suitable metallic gloss to an adherend.

Incidentally, when the brilliant pigment includes a metal-containing brilliant pigment, the content of the metal-containing brilliant pigment is more preferably 30 mass % or more, more preferably 50 mass % or more, and further preferably 70 mass % or more with respect to the total amount of the brilliant pigment.

Examples of the pearl pigment include pigments having pearly gloss or interference gloss, such as titanium dioxide-coated mica, fish scale foil, bismuth oxychloride, silicon dioxide, metal oxides, and lamination layers thereof.

The metal-containing brilliant pigment can be at least one of single metals such as aluminum, silver, gold, nickel, chromium, tin, zinc, indium, titanium, and copper; metal compounds; alloys; and mixtures thereof. It is preferable to use a metal-containing brilliant pigment containing aluminum. It is possible to give more suitable metallic gloss to an adherend by using a brilliant pigment containing aluminum.

Although the content of the brilliant pigment is not particularly limited, as long as it is 1.5 mass % or more with respect to the total amount of the ink composition, with the lower limit of the content of the brilliant pigment is preferably 2.0 mass % or more and more preferably 2.5 mass % or more with respect to the total amount of the ink composition. Consequently, it is possible to give more suitable metallic gloss to an adherend. The upper limit of the content of the brilliant pigment is not particularly limited but is preferably 5.0 mass % or less, more preferably 4.5 mass % or less, and further preferably 4.0 mass % or less with respect to the total amount of the ink composition. Within such a range, the dispersibility of the brilliant pigment in an ink composition or dispersion is improved.

The metal-containing brilliant pigment preferably has a volume-based 50% cumulative particle diameter (D50) (which may be also referred to as a volume-average particle diameter or a median diameter) of 0.01 μm or more and 3.0 μm or less, a volume-based 90% cumulative particle diameter (D90) of 4.5 μm or less, and a thickness of 10 nm or more and 1.0 μm or less. In such a form, it is possible to give more suitable metallic gloss to an adherend.

The lower limit of the volume-based 50% cumulative particle diameter (D50) of the metal-containing brilliant pigment is more preferably 0.02 μm or more, and further preferably 0.03 μm or more. The upper limit of the volume-based 50% cumulative particle diameter (D50) of the metal-containing brilliant pigment is more preferably 2.7 μm or less, and further preferably 2.5 μm or less. The volume-based 90% cumulative particle diameter (D90) of the metal-containing brilliant pigment is more preferably 4.0 μm or less, and further preferably 3.5 μm or less.

When the thickness of the metal-containing brilliant pigment is 10 nm or more, the reflectivity and brilliancy of the metal-containing brilliant pigment is improved, resulting in being the pigment capable of giving more suitable metallic gloss to an adherend. When the thickness of the metal-containing brilliant pigment is 1.0 μm or less, the dispersibility of the metal-containing brilliant pigment in the ink composition or dispersion is improved.

The lower limit of the thickness of the metal-containing brilliant pigment is more preferably 20 nm or more, and further preferably 30 nm or more. The upper limit of the thickness of the metal-containing brilliant pigment is more preferably 0.8 μm or less, and further preferably 0.5 μm or less.

Incidentally, the volume-based 50% cumulative particle diameter (D50) (which may be also referred to as a volume-average particle diameter or a median diameter), volume-based 90% cumulative particle diameter (D90), and thickness of the brilliant pigment can be measured using, for example, "FPIA-3000S" manufactured by Sysmex Corporation, a laser diffraction particle size analyzer "SALD 7500nano" manufactured by Shimadzu Corporation, and a scanning electron microscope (SEM).

The brilliant pigment can be obtained by mechanically shaping metal-containing particles, for example, by grinding in a ball mill or attrition mill. The metal-containing particles can also be obtained by known atomizing methods.

As another manufacturing method of the brilliant pigment, it is also possible to finely grind the metal-containing thin film formed on a substrate. As such a method, for example, mentioned is a method in which a metal-containing thin film of a thickness of about 10 nm or more and 1.0 μm or less is formed on a flat substrate coated with a release resin layer by vacuum deposition, ion plating, sputtering method, or the like and the metal-containing thin film is peeled from the substrate and is finely ground. Incidentally, the term "metal-containing thin film" is used as a concept including thin films containing metal compounds such as metal oxides. The lower limit of the thickness of the metal-containing thin film is more preferably 15 nm or more, and further preferably 20 nm or more. The upper limit of the thickness of the metal-containing thin film is more preferably 0.9 μm or less, and further preferably 0.8 μm or less.

Specific examples of the substrate used for manufacturing the brilliant pigment are polytetrafluoroethylene films; polyethylene films; polypropylene films; polyester films such as a polyethylene terephthalate film; polyamide films such as 66 nylon and 6 nylon films; polycarbonate films; triacetate films; and polyimide films. A preferable substrate is a film made from polyethylene terephthalate or copolymer thereof.

The lower limit of the preferable thickness of the substrate used for manufacturing the brilliant pigment is not particularly limited but is preferably 10 μm or more, more preferably 15 μm or more, and further preferably 20 μm or more. When the thickness of the substrate is 10 μm or more, the handleability improves. The upper limit of the preferable thickness of the sheet-like substrate is not particularly limited but is preferably 150 μm or less, more preferably 145 μm or less, and further preferably 140 μm or less. When the thickness of the substrate is 150 μm or less, the flexibility of the printed matter is improved, resulting in easier in rolling and peeling.

Specific examples of the resin used in the release resin layer coating the substrate are polyvinyl alcohol, polyvinyl butyral, polyethylene glycol, polyacrylic acid, polyacrylamide, cellulose derivatives, polyvinyl acetal, an acrylic acid copolymer, and a modified nylon resin. In order to form a resin into a resin layer to be used as the release resin layer, a resin solution is applied onto a sheet-like substrate by gravure coating, roll coating, blade coating, extrusion coating, dip coating, spin coating, or the like to form a release resin layer.

The lower limit of the thickness of the release resin layer is not particularly limited but is preferably 0.1 μm or more, more preferably 0.3 μm or more, and further preferably 0.5 μm or more. When the thickness is 0.1 μm or more, it is possible to easily peel the metal-containing thin film from the substrate. The upper limit of the thickness of the release resin layer is not particularly limited but is preferably 50 μm or less, more preferably 30 μm or less, and further preferably 10 μm or less. When the thickness is 50 μm or less, the metal-containing thin film can be easily peeled from the substrate.

Incidentally, the ink composition or the dispersion to be used for manufacturing the ink composition may be produced from a printed matter in which a metal-containing thin film is formed on a substrate. The printed matter may be immersed in a solvent that can dissolve the release resin and does not react to the brilliant pigment or may be subjected to ultrasonication while being immersed. Examples of such a solvent include the polymerizable compound and solvent constituting the ink composition. The release resin has a function as a dispersant for dispersing the brilliant pigment and improves the dispersibility of the brilliant pigment. In this case, the particle diameter of the brilliant pigment and the film thickness can be adjusted by the conditions when the metal-containing thin film is formed, and the time taken for ultrasonic dispersion. Incidentally, the brilliant pigment may be collected by sedimentation of the brilliant pigment from the release resin dissolution solution by centrifugation and may be dispersed in the polymerizable compound, solvent, and so on constituting the ink composition.

[Polymerizable Compound]

The polymerizable compound is a compound having an ethylene-based unsaturated double bond that is polymerized by being irradiated with active energy rays. The active energy rays include electromagnetic waves such as far-ultraviolet rays, ultraviolet rays, near-ultraviolet rays, visible light rays, infrared rays, X-rays, and γ-rays.

The polymerizable compound may be a monofunctional polymerizable compound, including one ethylene-based unsaturated double bond in the compound, or may be a polyfunctional polymerizable compound, including two or more ethylene-based unsaturated double bonds in the compound. Incidentally, the polymerizable compound is a concept including compounds also referred to as an oligomer or a polymer depending on the molecular weight thereof.

Examples of the monofunctional monomer include tetrahydrofurfuryl acrylate (THFA), cyclic trimethylolpropane formal acrylate (CTFA), 2-methyl-2-ethyl-1,3-dioxolan-4-yl acrylate, 2-methyl-2-isobutyl-1,3-dioxolan-4-yl (meth)acrylate, cyclohexanespiro-2-(1,3-dioxolan-4-yl) (meth)acrylate, 4-t-butylcyclohexyl acrylate as an alkylcycloalkyl acrylate, benzyl acrylate, phenoxyethyl acrylate, isobornyl acrylate, dicyclopentanyl acrylate, dicyclopentenyl acrylate, dicyclopentenyloxyethyl acrylate, γ-butyrolactone acrylate, cresol acrylate, 2-acryloyloxyethyl phthalate, 2-acryloyloxyethyl-2-hydroxyethyl phthalate, 2-acryloyloxyethyl hexahydrophthalate, 2-acryloyloxypropyl phthalate, paracumylphenoxyethylene glycol acrylate, nonylphenoxypolyethylene glycol acrylate, 1-adamantyl acrylate, cyclohexyl acrylate, 3-3-5-trimethylcyclohexyl acrylate, 2-hydroxy-3-phenoxypropyl acrylate, acryloylmorpholine, N-vinylcaprolactam, imide acrylate, isooctyl acrylate, tridecyl acrylate, lauryl acrylate, 2-hydroxyethyl acrylate, stearyl acrylate, isodecyl acrylate, caprolactone acrylate, methoxypolyethylene glycol acrylate, methoxypolypropylene glycol acrylate, 2-methoxyethyl acrylate, ethylcarbitol acrylate, and 2-ethylhexyl acrylate, and these acrylates having various modifications such as alkoxy modification and caprolactone modification.

Examples of the polyfunctional monomer include ethylene glycol di(meth)acrylate, diethylene glycol di(meth)acrylate, dipropylene glycol di(meth)acrylate, tripropylene glycol di(meth)acrylate, hexanediol di(meth)acrylate, long-chain aliphatic di(meth)acrylate, 1,4-butanediol di(meth)acrylate, 1,6-hexanediol di(meth)acrylate, 1,9-nonanediol di(meth)acrylate, neopentyl glycol di(meth)acrylate, hydroxypivalic acid neopentyl glycol di(meth)acrylate, stearic acid-modified pentaerythritol di(meth)acrylate, propylene glycol di(meth)acrylate, glycerol di(meth)acrylate, triethylene glycol di(meth)acrylate, 2-(2-vinyloxyethoxy)ethyl acrylate, tetraethylene glycol di(meth)acrylate, tetramethylene glycol di(meth)acrylate, butylene glycol di(meth)acrylate, propoxylated neopentyl glycol di(meth)acrylate, polyethylene glycol di(meth)acrylate, polypropylene di(meth)acrylate, triglycerol di(meth)acrylate, neopentyl glycol-modified trimethylolpropane di(meth)acrylate, allylated cyclohexyl di(meth)acrylate, methoxylated cyclohexyl di(meth)acrylate, acrylated isocyanurate, bis(acryloxyneopentyl glycol)adipate, bisphenol A di(meth)acrylate, tetrabromobisphenol A di(meth)acrylate, bisphenol S di(meth)acrylate, butanediol di(meth)acrylate, phthalic acid di(meth)acrylate, phosphoric acid di(meth)acrylate, zinc di(meth)acrylate, pentaerythritol tetracrylate, ditrimethylolpropane tetracrylate, dipentaerythritol pentaacrylate, dipentaerythritol hexaacrylate, trimethylolpropane tri(meth)acrylate, pentaerythritol tri(meth)acrylate, and glycerol tri(meth)acrylate, and these (meth)acrylates in which the number of modifications, the type of modification, or the structure is different from those above.

[Polymerization Initiator]

The ink composition according to the present embodiment contains polymerization initiators. The polymerization initiators promote the polymerization reaction of polymerizable compounds in an ink composition through irradiation with active energy rays. The polymerization initiators are characterized in containing an acylphosphine oxide-based polymerization initiator, an aminoacetophenone-based polymerization initiator, and a thioxanthone-based polymerization initiator at a content of 10 mass % or more with respect to the total amount of the ink composition.

The acylphosphine oxide-based polymerization initiator is a polymerization initiator having an acylphosphine oxide skeleton. Examples of the acylphosphine oxide-based polymerization initiator include bisacylphosphine oxides, such as bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-propylphenylphosphine oxide, bis-(2,6-dichlorobenzoyl)-1-naphthylphosphine oxide, bis-(2,6-dimethoxybenzoyl)phenylphosphine oxide, bis-(2,6-dimethoxybenzoyl)-2,4,4-trimethylpentylphosphine oxide, bis-(2,6-dimethoxybenzoyl)-2,5-dimethylphenylphosphine oxide, and bis-(2,4,6-trimethylbenzoyl)-phenylphosphine oxide; and monoacylphosphine oxides, such as 2,6-dimethoxybenzoyldiphenylphosphine oxide, 2,6-dichlorobenzoyldiphenylphosphine oxide, methyl 2,4,6-trimethylbenzoylphenylphosphinate, 2-methylbenzoyldiphenylphosphine oxide, isopropyl pivaloylphenylphosphinate, and 2,4,6-trimethylbenzoyldiphenylphosphine oxide.

The aminoacetophenone-based polymerization initiator is a polymerization initiator having an aminoacetophenone skeleton. Examples of the aminoacetophenone-based polymerization initiator include 2-methyl-1-[4-(methylthio)phenyl]-2-morpholinopropan-1-one, 2-benzyl-2-dimethylamino-1-(4-morpholinophenyl)-butan-1-one, and 2-(dimethylamino)-2-[(4-methylphenyl)methyl]-1-[4-(4-morpholinyl)phenyl]-1-butanone.

The thioxanthone-based polymerization initiator is a polymerization initiator having a thioxanthone skeleton. Examples of the thioxanthone-based polymerization initiator include 2-methylthioxanthone, 2-ethylthioxanthone, 2-chlorothioxanthone, 2,4-dimethylthioxanthone, 2,4-diethylthioxanthone, and 2-isopropylthioxanthone.

The content of the acylphosphine oxide-based polymerization initiator with respect to the total amount of the polymerization initiators is not particularly limited. However, in particular, the lower limit of the content of the acylphosphine oxide-based polymerization initiator is preferably 5 mass % or more, more preferably 7 mass % or more, and further preferably 10 mass % or more with respect to the total amount of the polymerization initiators. The upper limit of the content of the acylphosphine oxide-based polymerization initiator is preferably 90 mass % or less, more preferably 80 mass % or less, and further preferably 39 mass % or less with respect of the total amount of the polymerization initiator. The content of the acylphosphine oxide-based polymerization initiator is particularly preferably 10 mass % or more and 39 mass % or less with respect to the total amount of the polymerization initiators. Within such range, the curability of the ink composition can be further improved while maintaining the glossiness of the printed matter.

The content of the aminoacetophenone-based polymerization initiator with respect to the total amount of the polymerization initiators is not particularly limited. However, in particular, the lower limit of the content of the aminoacetophenone-based polymerization initiator is preferably 3 mass % or more, more preferably 4 mass % or more, and further preferably 5 mass % or more with respect to the total amount of the polymerization initiators. The upper limit of the content of the aminoacetophenone-based polymerization initiator is preferably 55 mass % or less, more preferably 53 mass % or less, and further preferably 50 mass % or less with respect to the total amount of the polymerization initiators. Within such a range, the curability of the ink composition can be further improved while maintaining the glossiness of the printed matter.

The content of the thioxanthone-based polymerization initiator with respect to the total amount of the polymerization initiators is not particularly limited. However, in particular, the lower limit of the content of the thioxanthone-based polymerization initiator is preferably 3 mass % or more, more preferably 4 mass % or more, and further preferably 5 mass % or more with respect to the total amount of the polymerization initiators. The upper limit of the content of the thioxanthone-based polymerization initiator is preferably 55 mass % or less, more preferably 53 mass % or less, and further preferably 50 mass % or less with respect to the total amount of the polymerization initiators. Within such range, the curability of the ink composition can be further improved while maintaining the glossiness of the printed matter.

The lower limit of the total content of the acylphosphine oxide-based polymerization initiator, the aminoacetophenone-based polymerization initiator, and the thioxanthone-based polymerization initiator is preferably 5 mass % or more, more preferably 6 mass % or more, and further preferably 7 mass % or more with respect to the total amount of the ink composition. The upper limit of the total content of the acylphosphine oxide-based polymerization initiator, the aminoacetophenone-based polymerization initiator, and the thioxanthone-based polymerization initiator is preferably 25 mass % or less, more preferably 23 mass % or less, and further preferably 20 mass % or less. Within such a range, the curability of the ink composition can be further improved while maintaining the glossiness of the printed matter.

Furthermore, the ink composition according to the present embodiment may contain a polymerization initiator that is different from the above-mentioned polymerization initiators. Specific examples of such a polymerization initiator include α-hydroxy ketones, benzoyl derivatives, benzyl ketals, diallyl ketones, aromatic onium salts, organic peroxides, thio compounds other than thioxanthone, hexaaryl-biimidazole compounds, ketoxime ester compounds, borate compounds, azinium compounds, metallocene compounds, titanocene compounds, active ester compounds, compounds having a carbon-halogen bond, and alkylamine compounds.

The content of the polymerization initiators is not particularly limited as long as it is 10 mass % or more with respect to the total amount of the ink composition. The upper limit of the content of the polymerization initiators is preferably 20 mass % or less, more preferably 18 mass % or less, and further preferably 15 mass % or less with respect to the total amount of the ink composition. When the content of the polymerization initiators is 10 mass % or more with respect to the total amount of the ink composition, the curability of the ink composition can be improved. When the content of the polymerization initiators is 20 mass % or less with respect to the total amount of the ink composition, other components (such as the polymerizable compound and the brilliant pigment) can be relatively increased, and thereby good metallic gloss can be provided, and the curability of the ink composition can be improved.

[Polymerization Inhibitor]

The ink composition according to the present embodiment may contain a polymerization inhibitor as needed. The polymerization inhibitor is not particularly limited, and, for example, polymerization inhibitors such as diphenylpicrylhydrazide, tri-p-nitrophenylmethyl, p-benzoquinone, p-tert-butylcatechol, picric acid, copper chloride, methylhydroquinone, methoquinone, tert-butylhydroquinone, phenothiazines, and nitrosamines can be used.

[Surface Conditioner]

The ink composition according to the present embodiment may contain a surface conditioner as needed. The surface conditioner is not particularly limited, and specific examples thereof include "BYK-306", "BYK-333", "BYK-371", and "BYK-377" each including dimethylpolysiloxane manufactured by BTK-Chemie GmbH and "Tego Rad 2010", "Tego Rad 2100", "Tego Rad 2200N", and "Tego Rad 2300" manufactured by Evonik Japan Co., Ltd.

[Other Additives]

The ink composition according to the present embodiment may contain other various additives, such as a solvent, a plasticizer, a light stabilizer, a wax, an antioxidant, and an orientation agent. Incidentally, the ink composition may contain a resin.

Incidentally, the ink composition according to the present embodiment may contain a coloring material (dye or pigment) that is used in ordinary inkjet ink compositions and is different from the brilliant pigment. The content of the coloring material is preferably 3.0 mass % or less, more preferably 1.0 mass % or less, further preferably 0.5 mass % or less, and even more preferably 0.2 mass % or less with respect to the total amount of the ink composition.

Viscosity and Surface Tension of Ink Composition

The viscosity of the ink composition according to the present embodiment is preferably 30 mPa·s or less, more preferably 25 mPa·s or less, and further preferably 22 mPa·s or less at the discharge temperature (for example, 40° C.) due to the inkjet discharge performance and discharge stability. In addition, the viscosity of the ink composition according to the present embodiment is preferably 5 mPa·s or more, more preferably 7 mPa·s or more, and further preferably 10 mPa·s or more.

Furthermore, the surface tension of the ink composition according to the present embodiment at 25° C. is preferably 20 mN/m or more, more preferably 23 mN/m or more, and further preferably 25 mN/m or more due to the inkjet discharge performance, discharge stability, and leveling property for the substrate. In addition, the surface tension of the ink composition according to the present embodiment is preferably 40 mN/m or less, more preferably 37 mN/m or less, and further preferably 35 mN/m or less.

(Manufacturing Method of Ink Composition)

The manufacturing method of the ink composition is not particularly limited, and a conventionally known methods can be used. The ink composition is obtained by dispersing a polymerizable compound, a brilliant pigment, polymerization initiators, a dispersant, and so on using a disperser, then adding a polymerization inhibitor, a leveling agent, and so on thereto as needed, and uniformly stirring them to obtain a mixture, then adding a brilliant pigment thereto, and further filtering the mixture with a filter to obtain an ink composition.

Then, a printed matter obtained by the ink composition according to the present embodiment will be described.

<1-2. Printed Matter>

The printed matter obtained using the ink composition according to the first embodiment includes a substrate (recording medium) and a brilliant layer formed on a surface of this substrate (recording medium). This brilliant layer contains a cured product of the polymerizable compound contained in the ink composition according to an embodiment of the first embodiment and a brilliant pigment. Here, since the ink composition according to the first embodiment contains 1.5 mass % or more of the brilliant pigment and contains multiple types of polymerization initiators having absorption wavelength regions different from each other, a brilliant layer with improved curability can be formed while maintaining the glossiness. Incidentally, the printed matter may include at least a substrate (recording medium) and a brilliant layer and may include, for example, a colored layer formed from an ordinary ink composition, a primer layer, and an overcoat layer in addition to the substrate (recording medium) and the brilliant layer.

Each layer constituting the printed matter will now be described.

[Substrate (Recording Medium)]

The substrate (recording medium) is not particularly limited, and may be a non-absorbent substrate such as a resin substrate and a metal plate glass, an absorbent substrate such as paper and fabric, or a surface-coated substrate such as a substrate having a receiving layer. Thus, various substrates can be used.

Examples of the non-absorbent substrate include resin substrates, such as a polyester resin, polypropylene synthetic paper, a vinyl chloride resin, and a polyimide resin, metals, metal foil coated paper, glass, synthetic rubber, and natural rubber.

Examples of the absorbent substrate include woody paper, medium-quality paper, woodfree paper, cotton, artificial fiber textile, silk, linen, fabric, nonwoven fabric, and leather.

Examples of the surface-coated substrate include coated paper, art paper, cast paper, lightweight coated paper, and lightly coated paper.

[Primer Layer]

The printed matter may include a primer layer. The primer layer is formed on a surface of a substrate (recording medium) and has a function of improving the adhesiveness to a colored layer or a brilliant layer.

The primer agent that can form the primer layer may be an active energy ray curable ink composition, a solvent-based ink composition containing a solvent, or an aqueous ink composition containing water. The primer agent is, for example, an ink composition forming a colored layer described later and may be an ink composition of which the main component is a resin component or a polymerizable compound and adjusted such that no color is visible by eliminating or reducing the coloring material. The adhesiveness to the colored layer can be improved by using a primer agent having the same composition as that of the colored layer. The primer agent may be, for example, a conventionally known primer agent.

The method for applying the primer agent to a surface of a substrate (recording medium) may be any method, for example, any of spray application, application using towel, sponge, nonwoven fabric, tissue, or the like, a dispenser, brush application, gravure printing, flexographic printing, silk screen printing, inkjetting, and heat transfer printing system.

[Colored Layer]

The printed matter may include a colored layer. The colored layer is a layer containing a coloring material (dye or pigment) that is used in ordinary ink compositions and is different from the brilliant pigment and is a layer formed from the ink composition applied mainly to the surface of the substrate or the surface of a layer (such as a primer layer, coating layer, or a layer of receiving solution) formed on the substrate. The ink composition for forming this colored layer may be an active energy ray curable ink composition, a solvent-based ink composition containing a coloring material and a solvent, or an aqueous ink composition containing a coloring material and water. Alternatively, a plurality of ink compositions (for example, in a case of a plurality of layers including a yellow ink, a magenta ink, a cyan ink, and a black ink) may be adopted. Since the brilliant layer formed from the ink composition according to the first embodiment can maintain the glossiness, an image formed from these multiple ink compositions becomes a printed matter having excellent scratch resistance and significantly excellent design properties that emphasize the image by glossiness.

The colored layer may contain a resin. When the colored layer contains a resin, this resin may be the binder resin or the polymer dispersant included in the ink composition, or may be the cured product formed by polymerization of the polymerizable compound included in the ink composition, discharged onto the surface of the substrate (recording medium) and then irradiated with active energy rays.

The method for applying the ink composition for forming the colored layer is not particularly limited. Examples thereof include a spray method, a coater method, an inkjet method, a gravure method, and a flexographic method. In particular, discharging (application) by an inkjet method is preferable. The inkjet method allows for discharging (application) to an arbitrary position of a substrate or discharging (application) to the whole surface of the substrate can be easily performed.

The coloring material of the ink composition forming the colored layer is not particularly limited and may be dye-based or pigment-based. It is preferable to use a pigment-based ink composition with good resistance, such as water resistance and light resistance, to the colored layer. The pigment that can be used in the ink composition to form a colored layer is not particularly limited. Examples thereof include organic pigments and inorganic pigments that are used in conventional ink compositions. They may be used alone or in combination of two or more. Specific examples of the organic pigment include an insoluble azo pigment, a soluble azo pigment, a derivative of a dye, a phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensed azo-based organic pigment, a benzimidazolone-based organic pigment, a quinophthalone-based organic pigment, an isoindoline-based organic pigment, and organic solid solution pigments such as a quinacridone-based solid solution pigment and a perylene-based solid solution pigment; and examples of the inorganic pigment include titanium oxide, zinc oxide, and other pigments such as carbon black. As the pigment that can be used in the ink composition, a plurality of organic pigments and inorganic pigments may be used in combination, or a pigment dispersoid dispersed in a water-soluble solvent by a pigment dispersant and a self-dispersion type pigment may be used in combination.

[Brilliant Layer]

The brilliant layer is a layer formed from an ink composition containing a polymerizable compound, a brilliant pigment, and polymerization initiators according to the first embodiment. Specifically, it is a layer containing a cured product of a polymerizable compound and a brilliant pigment formed by discharging an ink composition containing the polymerizable compound, the brilliant pigment, and polymerization initiators onto a surface of an adherend by an inkjet method and irradiating the ink composition with active energy rays.

Since the curing rate of the ink composition can be appropriately adjusted by containing a plurality of polymerization initiators with absorption wavelength regions different from each other, this brilliant layer can thus improve the curability while maintaining the glossiness.

This brilliant layer contains the brilliant pigment, preferably in a proportion of 1.5 mass % or more, more preferably in a proportion of 2.0 mass % or more, and preferably in a proportion of 2.5 mass % or more with respect to the total amount of the brilliant layer. This brilliant layer contains the brilliant pigment preferably in a proportion of 5.0 mass % or less, more preferably in a proportion of 4.5 mass % or less, and further preferably in a proportion of 4.0 mass % or less with respect to the total amount of the brilliant layer.

[Overcoat Layer]

The printed matter may include an overcoat layer. The overcoat layer is formed on the uppermost surface of the printed matter (for example, the surface of the brilliant layer or the colored layer), and has a function of improving the durability of the printed matter.

The overcoat agent that can form the overcoat layer may be an active energy ray curable ink composition, a solvent-based ink composition containing a solvent, or an aqueous ink composition containing water. The overcoat agent may be, for example, an ink composition forming the colored layer described above and may be an ink composition of which the main component is a resin component or a polymerizable compound and adjusted such that no color is visible by eliminating or reducing the coloring material. The adhesiveness to the colored layer can be improved by using an overcoat agent having the same composition as that of the colored layer. The overcoat agent may be, for example, a conventionally known overcoat agent.

The method for applying the overcoat agent to the surface of the brilliant layer or colored layer may be any method, for example, any of spray application, application using towel, sponge, nonwoven fabric, tissue, or the like, a dispenser, brush application, gravure printing, flexographic printing, silk screen printing, inkjetting, and heat transfer printing system.

<1-3. Recording Method>

The recording method for recording on the surface of a substrate (recording medium) using the ink composition according to the first embodiment is a recording method of discharging an active energy ray curable ink composition by an inkjet method. It is possible to support the manufacturing of a printed matter in small lots by discharging the ink composition by the inkjet method.

The inkjet recording apparatus can be applied to any inkjet recording apparatus, for example, a piezoelectric system, a thermal system, or an electrostatic system.

Furthermore, the ink composition discharged by the inkjet method is irradiated with active energy rays. Examples of the active energy rays include active energy rays such as electron rays, proton rays, and neutron rays, in addition to electromagnetic waves such as far-ultraviolet rays, ultraviolet rays, near-ultraviolet rays, visible light rays, infrared rays, X-rays, and γ-rays. The light source for irradiating active energy rays is not particularly limited, and examples thereof include a high-pressure mercury lamp, a metal halide lamp, a low-pressure mercury lamp, an extra-high-pressure mercury lamp, an ultraviolet laser, sunlight, and an LED lamp. It is more preferable to use an LED lamp as the light source due to energy saving and a high degree of freedom in designing and equipping the printing apparatus.

The printed matter obtained by this recording method can improve the curability while maintaining the glossiness.

<1-4. Manufacturing Method of Printed Matter>

The recording method by discharging the ink composition according to the first embodiment onto a surface of a substrate can also be defined as a manufacturing method of a printed matter.

The printed matter obtained by this manufacturing method can improve the curability while maintaining the glossiness.

2. Second Embodiment

A second embodiment of the present invention relates to a printed matter, an active energy ray curable ink composition to be used in manufacturing of the printed matter, a recording method using this ink composition, and a manufacturing method of a printed matter using this ink composition.

<2-1. Printed Matter>

The printed matter according to the present embodiment is a printed matter that includes a substrate (recording medium) and a brilliant layer formed on a surface of this substrate (recording medium) and containing a brilliant pigment. In addition, as shown in FIG. 1, when incident light is incident on the brilliant layer at an incidence angle of 45° with respect to the brilliant layer of the printed matter, L1, the total of L* values regarding a reflection angle of −15° and a reflection angle of 15° in the L*a*b* color system (based on JISZ 8729), is 200 or more, provided that the angle of the specular reflection light in response to the incident light and the angle of a normal line with respect to the brilliant layer are defined as 0° and 45°, respectively. In addition, L2, the total of L* values regarding a reflection angle of 45°, a reflection angle of 75°, and a reflection angle of 110° in the L*a*b* color system, is 100 or more. Furthermore, (L1−L2), the difference between L1, the total of L* values regarding a reflection angle of −15° and a reflection angle of 15°, and L2, the total of L* values regarding a reflection angle of 45°, a reflection angle of 75°, and a reflection angle of 110°, is characterized by being 90 or more. Incidentally, in the present specification, these L1 and L2, totals of L* values, may be simply written as L1 and L2, respectively.

Here, L1 means the total value of lightness in the directions (15° and −15°) where the specular reflection light with respect to the angle of the incident light incident on the brilliant layer is present. In a printed matter, including a brilliant layer having an L1 of 200 or more, the reflection light by the brilliant pigment becomes stronger. Consequently, the brightness of the surface of the printed matter on the brilliant layer side is improved.

L2 means the total value of lightness in the directions (45°, 75°, and 110°) which are not affected by the specular reflection light with respect to the angle of the incident light incident on the brilliant layer. In a printed matter including a brilliant layer having an L2 of 100 or more, the scattered light by the brilliant pigment becomes stronger. Consequently, the surface of the printed matter on the brilliant layer side further whitens.

It was found by the studies of the present inventors that when the relationship between L1 resulting from the intensity of reflection light and L2 resulting from the intensity of scattered light satisfies L1≥200, L2≥100, and L1−L2≥90, a printed matter having good metallic gloss and high design properties allowing to shine in a wide angle, which has not been able to be expressed by an inkjet system printing method. When L1<200, the brightness of the surface of the printed matter on the brilliant layer side decreases to reduce the metallic gloss. When L2<100, the surface on the brilliant layer side becomes blackish to provide a printed matter with a mirror-like surface as in conventional inkjet printed matters. When L1−L2<90, the brightness of the surface of the printed matter on the brilliant layer side decreases, or even if the surface on the brilliant layer side is sufficiently bright, the glossiness peculiar to metal (a property of changing the lightness depending on the observation angle) disappears.

Incidentally, L1 is preferably L1≥215 and more preferably L1≥230. L2 is preferably L2≥105 and more preferably L2≥110. L1−L2 is preferably L1−L2≥100 and more preferably L1−L2≥110.

Then, each layer constituting this printed matter will be described.

[Substrate (Recording Medium)]

The substrate (recording medium) is not particularly limited and may be a non-absorbent substrate such as a resin substrate and a metal plate glass, an absorbent substrate such as paper and fabric, or a surface-coated substrate such as a substrate having a receiving layer. Thus, various substrates can be used.

Examples of the non-absorbent substrate include resin substrates, such as a polyester resin, polypropylene synthetic paper, a vinyl chloride resin, and a polyimide resin, metals, metal foil coated paper, glass, synthetic rubber, and natural rubber.

Examples of the absorbent substrate include woody paper, medium-quality paper, woodfree paper, cotton, artificial fiber textile, silk, linen, fabric, nonwoven fabric, and leather.

Examples of the surface-coated substrate include coated paper, art paper, cast paper, lightweight coated paper, and lightly coated paper.

[Primer Layer]

The printed matter may include a primer layer. The primer layer is formed on a surface of a substrate (recording medium) and has a function of improving the adhesiveness to a colored layer or a brilliant layer.

The primer agent that can form the primer layer may be an active energy ray curable ink composition, a solvent-based ink composition containing a solvent, or an aqueous ink composition containing water. The primer agent is, for example, an ink composition forming a colored layer described later and may be an ink composition of which the main component is a resin component or a polymerizable compound and adjusted such that no color is visible by eliminating or reducing the coloring material. The adhesiveness to the colored layer can be improved by using a primer agent having the same composition as that of the colored layer. The primer agent may be, for example, a conventionally known primer agent.

The method for applying the primer agent to a surface of a substrate (recording medium) may be any method, for example, any of spray application, application using towel, sponge, nonwoven fabric, tissue, or the like, a dispenser, brush application, gravure printing, flexographic printing, silk screen printing, inkjetting, and heat transfer printing system.

[Colored Layer]

The printed matter may include a colored layer. The colored layer is a layer containing a coloring material (dye or pigment) that is used in ordinary ink compositions and is different from the brilliant pigment and is a layer formed from the ink composition applied mainly to the surface of the substrate or the surface of a layer (such as a primer layer, coating layer, or a layer of receiving solution) formed on the substrate. The ink composition for forming this colored layer may be an active energy ray curable ink composition, a solvent-based ink composition containing a coloring material and a solvent, or an aqueous ink composition containing a coloring material and water.

The colored layer may contain a resin. When the colored layer contains a resin, this resin may be the binder resin or the polymer dispersant included in the ink composition or may be the cured product formed by polymerization of the polymerizable compound included in the ink composition discharged onto the surface of the substrate (recording medium) and then irradiated with active energy rays.

The method for applying the ink composition for forming the colored layer is not particularly limited. Examples thereof include a spray method, a coater method, an inkjet method, a gravure method, and a flexographic method. In particular, discharging (application) by an inkjet method is preferable. According to the inkjet method, discharging (application) to an arbitrary position of a substrate or discharging (application) to the whole surface of the substrate can be easily performed.

The coloring material of the ink composition forming the colored layer is not particularly limited and may be dye-based or pigment-based. It is preferable to use a pigment-based ink composition which provides good resistance, such as water resistance and light resistance, to the colored layer. The pigment that can be used in the ink composition to form a colored layer is not particularly limited. Examples thereof include organic pigments and inorganic pigments that are used in conventional ink compositions. They may be used alone or in combination of two or more. Specific examples of the organic pigment include an insoluble azo pigment, a soluble azo pigment, a derivative of a dye, a phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensed azo-based organic pigment, a benzimidazolone-based organic pigment, a quinophthalone-based organic pigment, an isoindoline-based organic pigment, and organic solid solution pigments such as a quinacridone-based solid solution pigment and a perylene-based solid solution pigment; and examples of the inorganic pigment include titanium oxide, zinc oxide, and other pigments such as carbon black. As the pigment that can be used in the ink composition, a plurality of organic pigments and inorganic pigments may be used in combination, or a pigment dispersoid dispersed in a water-soluble solvent by a pigment dispersant and a self-dispersion type pigment may be used in combination.

[Brilliant Layer]

The brilliant layer is a layer formed from an ink composition containing a brilliant pigment. Specifically, it is a layer formed by discharging an ink composition containing a brilliant pigment onto a surface of an adherend by an inkjet method.

This brilliant layer contains the brilliant pigment preferably in a proportion of 5.0 mass % or less, more preferably in a proportion of 4.5 mass % or less, and preferably in a proportion of 4.0 mass % or less with respect to the total amount of the brilliant layer. This brilliant layer contains the brilliant pigment preferably in a proportion of 1.0 mass % or more, more preferably in a proportion of 1.5 mass % or more, and preferably in a proportion of 2.0 mass % or more with respect to the total amount of the brilliant layer.

[Overcoat Layer]

The printed matter may include an overcoat layer. The overcoat layer is formed on the uppermost surface of the printed matter (for example, the surface of the brilliant layer or the colored layer) and has a function of improving the durability of the printed matter.

The overcoat agent that can form the overcoat layer may be an active energy ray curable ink composition, a solvent-based ink composition containing a solvent, or an aqueous ink composition containing water. The overcoat agent may be, for example, an ink composition forming the colored layer described above and may be an ink composition of which the main component is a resin component or a polymerizable compound and adjusted such that no color is visible by eliminating or reducing the coloring material. The adhesiveness to the colored layer can be improved by using an overcoat agent having the same composition as that of the colored layer. The overcoat agent may be, for example, a conventionally known overcoat agent.

The method for applying the overcoat agent to the surface of the brilliant layer or colored layer may be any method, for example, any of spray application, application using towel, sponge, nonwoven fabric, tissue, or the like, a dispenser, brush application, gravure printing, flexographic printing, silk screen printing, inkjetting, and heat transfer printing system.

Then, an example of the ink composition that can form a brilliant layer will be described.

<2-2. Ink Composition>

The ink composition according to the present embodiment is an active energy ray curable ink composition to be discharged by an inkjet method. This ink composition contains a polymerizable compound and a brilliant pigment and forms a brilliant layer containing the brilliant pigment on a surface of an adherend by being irradiated with active energy rays to be capable of giving metallic gloss to the adherend. Incidentally, the adherend in the present specification may be the surface itself of the recording medium or may be a colored layer, a primer layer, or an overcoat layer formed on a part or the whole of the surface of the recording medium, and is thus not particularly limited. In addition, although details will be described later, the "colored layer" in the present specification means a layer containing a coloring material (dye or pigment) that is used in ordinary ink compositions and is different from the brilliant pigment.

The content of the brilliant pigment included in this ink composition is 1.0 mass % or more. Consequently, it is possible to provide good metallic gloss.

It is characteristic that the contact angle of the ink composition on a wet film is 29.5° or more and 70.0° or less. It was found by the studies of the present inventors that the orientation of the brilliant pigment contained in the brilliant layer changes depending on the contact angle of the ink composition on a wet film. Specifically, when the contact angle of the ink composition on a wet film is small, the orientation of the brilliant pigment included in the brilliant layer is decreased to weaken the reflection light and scattered light by the brilliant pigment. That is, the L1 and L2 of the brilliant layer decrease. In contrast, when the contact angle of the ink composition on a wet film is large, the orientation of the brilliant pigment included in the brilliant layer is increased to strengthen the reflection light and scattered light by the brilliant pigment. That is, the L1 and L2 of the brilliant layer increase.

The brilliant pigment included in the brilliant layer is appropriately oriented by adjusting the contact angle of the ink composition on a wet film to 29.5° or more and 70.0° or less, and a printed matter having a brilliant layer satisfying relationships of $L1 \geq 200$, $L2 \geq 100$, and $L1-L2 \geq 90$ can be obtained as a result.

Incidentally, the lower limit of the contact angle of the ink composition on a wet film is preferably 29.7° or more and more preferably 30.0° or more. The upper limit of the contact angle of the ink composition on a wet film is preferably 60.0° or less and more preferably 50.0° or less.

The contact angle of an ink composition on a wet film can be determined with an automatic contact angle measuring instrument at a condition of 25° C. by applying the ink composition in an uncured wet film state onto a flat plate and allowing 2.0 µL of a droplet of the ink composition to adhere onto the wet film, and measuring the contact angle after 100 ms.

As a method for obtaining an ink composition exhibiting an adjusted contact angle on a wet film, the type and content of the polymerizable compound contained in the ink composition may be adjusted. For example, since the surface tension and contact angle of a polymerizable compound are correlated, exemplified is a method in which the surface tension of each polymerizable compound is determined, and the calculated value of the surface tension is determined based on the weight average of the ink composition and is converted. For example, a plurality of ink compositions in which the types and contents of polymerizable compounds are different from each other are produced, the calculated value of the surface tension of each ink composition determined from the surface tension of each polymerizable compound and the contact angle of the corresponding ink composition on a wet film are plotted, and the type and content of each polymerizable compound may be selected from the approximation equation of the plots such that the contact angle on a wet film is 29.5° or more and 70.0° or less.

Then, each component included in the ink composition according to the present embodiment will be respectively described.

[Brilliant Pigment]

The brilliant pigment has a function of giving metallic gloss to an adherend. Examples of the brilliant pigment include those containing a pearl pigment or a metal-containing brilliant pigment. In particular, the brilliant pigment preferably includes a metal-containing brilliant pigment. The metal-containing brilliant pigment can give more suitable metallic gloss to an adherend.

Incidentally, when the brilliant pigment includes a metal-containing brilliant pigment, the content of the metal-containing brilliant pigment is more preferably 30 mass % or more, more preferably 50 mass % or more, and further preferably 70 mass % or more with respect to the total amount of the brilliant pigment.

Examples of the pearl pigment include pigments having pearly gloss or interference gloss, such as titanium dioxide-coated mica, fish scale foil, bismuth oxychloride, silicon dioxide, metal oxides, and lamination layers thereof.

The metal-containing brilliant pigment can be at least one of single metals such as aluminum, silver, gold, nickel, chromium, tin, zinc, indium, titanium, and copper; metal compounds; alloys; and mixtures thereof. It is preferable to use a metal-containing brilliant pigment containing aluminum. It is possible to give more suitable metallic gloss to an adherend by using a brilliant pigment containing aluminum.

Although the content of the brilliant pigment is not particularly limited as long as it is 1.0 mass % or more with respect to the total amount of the ink composition, the lower limit of the content of the brilliant pigment is preferably 1.5 mass % or more and more preferably 2.0 mass % or more with respect to the total amount of the ink composition. Consequently, it is possible to give more suitable metallic gloss to an adherend. The upper limit of the content of the brilliant pigment is not particularly limited but is preferably 5.0 mass % or less, more preferably 4.5 mass % or less, and further preferably 4.0 mass % or less with respect to the total amount of the ink composition. Consequently, the dispersibility of the brilliant pigment in an ink composition or dispersion is improved.

The metal-containing brilliant pigment preferably has a volume-based 50% cumulative particle diameter (D50) (which may be also referred to as a volume-average particle diameter or a median diameter) of 0.01 μm or more and 3.0 μm or less, a volume-based 90% cumulative particle diameter (D90) of 4.5 μm or less, and a thickness of 10 nm or more and 1.0 μm or less. In such a form, it is possible to give more suitable metallic gloss to an adherend.

The lower limit of the volume-based 50% cumulative particle diameter (D50) (which may be also referred to as a volume-average particle diameter or a median diameter) of the metal-containing brilliant pigment is more preferably 0.02 μm or more, and further preferably 0.03 μm or more. The upper limit of the volume-based 50% cumulative particle diameter (D50) of the metal-containing brilliant pigment is more preferably 2.7 μm or less, and further preferably 2.5 μm or less. The volume-based 90% cumulative particle diameter (D90) of the metal-containing brilliant pigment is more preferably 4.0 μm or less, and further preferably 3.5 μm or less.

When the thickness of the metal-containing brilliant pigment is 10 nm or more, the reflectivity and brilliancy of the metal-containing brilliant pigment are improved, resulting in being capable of giving more suitable metallic gloss to an adherend. When the thickness of the metal-containing brilliant pigment is 1.0 μm or less, the dispersibility of the metal-containing brilliant pigment in the ink composition or dispersion is improved.

The lower limit of the thickness of the metal-containing brilliant pigment is more preferably 20 nm or more, and further preferably 30 nm or more. The upper limit of the thickness of the metal-containing brilliant pigment is more preferably 0.8 μm or less, and further preferably 0.5 μm or less.

Incidentally, the volume-based 50% cumulative particle diameter (D50) (which may be also referred to as a volume-average particle diameter or a median diameter), volume-based 90% cumulative particle diameter (D90), and thickness of the brilliant pigment can be measured using, for example, "FPIA-3000S" manufactured by Sysmex Corporation, a laser diffraction particle size analyzer "SALD 7500nano" manufactured by Shimadzu Corporation, and a scanning electron microscope (SEM).

The brilliant pigment can be obtained by mechanically shaping metal-containing particles, for example, by grinding in a ball mill or attrition mill. The metal-containing particles can also be obtained by a known atomizing method.

As another manufacturing method of the brilliant pigment, it is also possible to finely grind the metal-containing thin film formed on a substrate. As such a method, for example, mentioned is a method in which a metal-containing thin film of a thickness of about 10 nm or more and 1.0 μm or less is formed on a flat substrate coated with a release resin layer by vacuum deposition, ion plating, sputtering method, or the like and the metal-containing thin film is peeled from the substrate and is finely ground. Incidentally, the term "metal-containing thin film" is used as a concept including thin films containing metal compounds such as metal oxides.

Specific examples of the substrate used for manufacturing the brilliant pigment are polytetrafluoroethylene films; polyethylene films; polypropylene films; polyester films such as a polyethylene terephthalate film; polyamide films such as 66 nylon and 6 nylon films; polycarbonate films; triacetate films; and polyimide films. A preferable substrate is a film of polyethylene terephthalate or a copolymer thereof.

The lower limit of the preferable thickness of the substrate used for manufacturing the brilliant pigment is not particularly limited but is preferably 10 μm or more. When the thickness of the substrate is 10 μm or more, the handleability becomes better. The upper limit of the preferable thickness of the sheet-like substrate is not particularly limited but is preferably 150 μm or less. When the thickness of the substrate is 150 μm or less, the flexibility of the printed matter is improved, resulting in easiness in rolling and peeling.

Specific examples of the resin used in the release resin layer coating the substrate are polyvinyl alcohol, polyvinyl butyral, polyethylene glycol, polyacrylic acid, polyacrylamide, a cellulose derivative, polyvinyl acetal, an acrylic acid copolymer, and a modified nylon resin. In order to form a resin into a resin layer to be used as the release resin layer, a resin solution is applied onto a sheet-like substrate by gravure coating, roll coating, blade coating, extrusion coating, dip coating, spin coating, or the like to form a release resin layer.

The lower limit of the thickness of the release resin layer is not particularly limited but is preferably 0.1 μm or more and more preferably 0.5 μm or more. When the thickness is μm or more, it is possible to easily peel the metal-containing thin film from the substrate. The upper limit of the thickness of the release resin layer is not particularly limited but is preferably 50 μm or less and more preferably 10 μm or less. When the thickness is 50 μm or less, the metal-containing thin film can be easily peeled from the substrate.

Incidentally, the ink composition or the dispersion to be used for manufacturing the ink composition may be produced from the printed matter in which a metal-containing thin film is formed on a substrate. The printed matter may be immersed in a solvent that can dissolve the release resin and does not react to the brilliant pigment or may be subjected to ultrasonication while being immersed. Examples of such a solvent include the polymerizable compound and solvent constituting the ink composition. The release resin has a function as a dispersant for dispersing the brilliant pigment and improves the dispersibility of the brilliant pigment. In this case, the particle diameter of the brilliant pigment and the film thickness can be adjusted by the conditions when the metal-containing thin film is formed and the ultrasonic dispersion time. Incidentally, the brilliant pigment may be collected by sedimentation of the brilliant pigment from the release resin dissolution solution by centrifugation and may be dispersed in the polymerizable compound, solvent, and so on constituting the ink composition.

[Polymerizable Compound]

The polymerizable compound is a compound having an ethylene-based unsaturated double bond that is polymerized by being irradiated with active energy rays. The active energy rays include electromagnetic waves such as far-ultraviolet rays, ultraviolet rays, near-ultraviolet rays, visible light rays, infrared rays, X-rays, and γ-rays.

The polymerizable compound may be a monofunctional polymerizable compound containing one ethylene-based unsaturated double bond in the compound or may be a polyfunctional polymerizable compound containing two or more ethylene-based unsaturated double bonds in the compound. Incidentally, the polymerizable compound is a concept that includes compounds also referred to as an oligomer or a polymer depending on the molecular weight thereof.

According to the present embodiment, the polymerizable compound occupies most of the ink composition, and therefore notably affects the contact angle of the ink composition on a wet film. Accordingly, it is preferable to select the type and content of each polymerizable compound such that the contact angle of the ink composition on a wet film is 29.5° or more and 70.0° or less.

In order to adjust the contact angle of the ink composition on a wet film to 29.5° or more and 70.0° or less, it is preferable to contain a hydrophobic polymerizable compound. Examples of the hydrophobic polymerizable compound include: polymerizable compounds with an aromatic ring structure, an aliphatic ring structure, or an alkyl chain structure having 4 or more carbon atoms. The content of the hydrophobic polymerizable compound in the ink composition is preferably 40 mass % or more, more preferably 50 mass % or more, and further preferably 60 mass % or more.

Examples of the monofunctional monomer include tetrahydrofurfuryl acrylate (THFA), cyclic trimethylolpropane formal acrylate (CTFA), 2-methyl-2-ethyl-1,3-dioxolan-4-yl acrylate, 2-methyl-2-isobutyl-1,3-dioxolan-4-yl (meth)acrylate, cyclohexanesipro-2-(1,3-dioxolan-4-yl) (meth)acrylate, t-butylcyclohexyl acrylate as an alkylcycloalkyl acrylate, benzyl acrylate, phenoxyethyl acrylate, isobornyl acrylate, neopentyl acrylate, dicyclopentanyl acrylate, dicyclopentenyl acrylate, dicyclopentenyloxyethyl acrylate, γ-butyrolactone acrylate, cresol acrylate, 2-acryloyloxyethyl phthalate, 2-acryloyloxyethyl-2-hydroxyethyl phthalate, 2-acryloyloxyethyl hexahydrophthalate, 2-acryloyloxypropyl phthalate, paracumylphenoxyethylene glycol acrylate, nonylphenoxypolyethylene glycol acrylate, 1-adamantyl acrylate, cyclohexyl acrylate, 3-3-5-trimethylcyclohexyl acrylate, 2-hydroxy-3-phenoxypropyl acrylate, acryloylmorpholine, N-vinylcaprolactam, imide acrylate, isooctyl acrylate, tridecyl acrylate, lauryl acrylate, 2-hydroxyethyl acrylate, stearyl acrylate, isodecyl acrylate, caprolactone acrylate, methoxypolyethylene glycol acrylate, methoxypolypropylene glycol acrylate, 2-methoxyethyl acrylate, ethylcarbitol acrylate, and 2-ethylhexyl acrylate, and these acrylates having various modifications such as alkoxy modification and caprolactone modification.

Examples of the polyfunctional monomer include ethylene glycol di(meth)acrylate, diethylene glycol di(meth)acrylate, dipropylene glycol di(meth)acrylate, tripropylene glycol di(meth)acrylate, hexanediol di(meth)acrylate, long-chain aliphatic di(meth)acrylate, 1,4-butanediol di(meth) acrylate, 1,6-hexanediol di(meth)acrylate, 1,9-nonanediol di(meth)acrylate, neopentyl glycol di(meth)acrylate, hydroxypivalic acid neopentyl glycol di(meth)acrylate, stearic acid-modified pentaerythritol di(meth)acrylate, propylene glycol di(meth)acrylate, glycerol di(meth)acrylate, triethylene glycol di(meth)acrylate, 2-(2-vinyloxyethoxy) ethyl acrylate, tetraethylene glycol di(meth)acrylate, tetramethylene glycol di(meth)acrylate, butylene glycol di(meth) acrylate, propoxylated neopentyl glycol di(meth)acrylate, polyethylene glycol di(meth)acrylate, polypropylene di(meth)acrylate, triglycerol di(meth)acrylate, neopentyl glycol-modified trimethylolpropane di(meth)acrylate, allylated cyclohexyl di(meth)acrylate, methoxylated cyclohexyl di(meth)acrylate, acrylated isocyanurate, bis-(acryloxyneopentyl glycol) adipate, bisphenol A di(meth)acrylate, tetrabromobisphenol A di(meth)acrylate, bisphenol S di(meth) acrylate, pentaacrylate, butanediol di(meth)acrylate, phthalic acid di(meth)acrylate, phosphoric acid di(meth) acrylate, zinc di(meth)acrylate, pentaerythritol tetracrylate, ditrimethylolpropane tetracrylate, dipentaerythritol pentaacrylate, dipentaerythritol hexaacrylate, trimethylolpropane tri(meth)acrylate, pentaerythritol tri(meth)acrylate, glycerol tri(meth)acrylate, and urethane acrylate, and these (meth)acrylates in which the number of modifications, the type of modification, or the structure is different from those above.

[Polymerization Initiator]

The ink composition according to the present embodiment may contain a polymerization initiator as needed. The polymerization initiator is not particularly limited as long as it promotes the polymerization reaction of a polymerizable compound in an ink composition by irradiation with active energy rays. Incidentally, in the ink composition according to the present embodiment, the polymerization initiator is not necessarily essential. For example, when electron rays are used as the active energy ray, the polymerization initiator need not be used.

Specific examples of the polymerization initiator include benzoyl derivatives, benzyl ketals, diallyl ketones including thioxanthone or the like, α-aminoalkylphenones, acylphosphine oxides, aminobenzoates, α-hydroxyketones, aromatic onium salts, organic peroxides, thio compounds, hexaarylbiimidazole compounds, ketoxime ester compounds, borate compounds, azinium compounds, metallocene compounds, active ester compounds, compounds possessing a carbon-halogen bond, and alkylamine compounds.

The amount of the polymerization initiator may be any amount that allows to appropriately start the polymerization reaction of the polymerizable compound and is preferably 1.0 mass % or more and more preferably 3.0 mass % or more with respect to the total amount of the ink composition. In addition, the amount of the polymerization initiator is preferably 20.0 mass % or less, more preferably 18.0 mass % or less, and further preferably 15.0 mass % or less in the total amount of the ink composition.

[Polymerization Inhibitor]

The ink composition according to the present embodiment may contain a polymerization inhibitor as needed. The polymerization inhibitor is not particularly limited, and polymerization inhibitors, such as diphenylpicrylhydrazide, tri-p-nitrophenylmethyl, p-benzoquinone, p-tert-butylcatechol, picric acid, copper chloride, methylhydroquinone, methoquinone, tert-butylhydroquinone, phenothiazines, and nitrosamines, can be used.

[Surface Conditioner]

The ink composition according to the present embodiment may contain a surface conditioner as needed, for example, when the contact angle of the ink composition on a wet film is high. The surface conditioner is not particularly limited, and specific examples thereof include "BYK-306", "BYK-333", "BYK-371", and "BYK-377" each containing dimethylpolysiloxane manufactured by BTK-Chemie GmbH and "Tego Rad 2010", "Tego Rad 2100", "Tego Rad 2200N", and "Tego Rad 2300" manufactured by Evonik Japan Co., Ltd.

[Other Additives]

The ink composition according to the present embodiment may contain other various additives, such as an organic solvent, a plasticizer, a light stabilizer, an antioxidant, a wax, and an orientation agent. Incidentally, the ink composition may contain a resin.

Incidentally, the ink composition according to the present embodiment may contain a coloring material (dye or pigment) that is used in ordinary inkjet ink compositions and is different from the brilliant pigment. The content of the coloring material is preferably 3.0 mass % or less, more preferably 1.0 mass % or less, further preferably 0.5 mass % or less, and even more preferably 0.2 mass % or less with respect to the total amount of the ink composition.

The ink composition according to the present embodiment may contain a nonpolymerizable organic solvent such as a volatile organic solvent as another additive, but it is preferable to appropriately adjust such that the contact angle of the ink composition on a wet film is 29.5° or more and 70.0° or less. The content of the nonpolymerizable organic solvent is preferably less than 10 mass %, more preferably less than 5.0 mass %, and further preferably less than 1.0 mass % with respect to the total amount of the ink composition.

Viscosity of Ink Composition

The viscosity of the ink composition according to the present embodiment is preferably 30 mPa·s or less, more preferably 25 mPa·s or less, and further preferably 20 mPa·s or less at the discharge temperature (for example, 40° C.) from due to inkjet discharge performance and discharge stability. In addition, the viscosity of the ink composition according to the present embodiment is preferably 3 mPa·s or more and more preferably 5 mPa·s or more. Incidentally, the viscosity of the ink composition according to the present embodiment is preferably adjusted within an appropriate range for the inkjet head used in the inkjet recording apparatus according to the temperature of the ink composition to be discharged. The viscosity can be measured with a vibrating viscometer, a rheometer, a falling ball viscometer, or the like.

(Manufacturing Method of Ink Composition)

The manufacturing method of the ink composition is not particularly limited, and a conventionally known method can be used. The ink composition is obtained by dispersing a polymerizable compound, a brilliant pigment, a dispersant, and so on using a disperser, then adding a polymerization initiator, a polymerization inhibitor, a leveling agent, and so on thereto as needed, and uniformly stirring them to obtain a mixture, then adding a brilliant pigment thereto, and further filtering the mixture with a filter to obtain an ink composition.

Next, a recording method using the ink composition according to the present embodiment and a manufacturing method for printed matter will be described.

<2-3. Recording Method>

The recording method for recording on the surface of a substrate (recording medium) using the ink composition, according to the second embodiment is a recording method that involves discharging an active energy ray curable ink composition by an inkjet method. It is possible to support the manufacturing of a printed matter in small lots by discharging the ink composition by the inkjet method.

The inkjet recording apparatus can be applied to any inkjet recording apparatus of, for example, a piezoelectric system, a thermal system, or an electrostatic system.

Furthermore, the ink composition discharged by the inkjet method is irradiated with active energy rays. Examples of the active energy rays include active energy rays such as electron rays, proton rays, and neutron rays, in addition to electromagnetic waves such as far-ultraviolet rays, ultraviolet rays, near-ultraviolet rays, visible light rays, infrared rays, X-rays, and γ-rays. The light source for irradiating active energy rays is not particularly limited, and examples thereof include a high-pressure mercury lamp, a metal halide lamp, a low-pressure mercury lamp, an extra-high pressure mercury lamp, an ultraviolet laser, sunlight, and an LED lamp. It is more preferable to use an LED lamp as the light source due to energy savings and a high degree of freedom in designing and equipping the printing apparatus.

The contact angle of the ink composition according to the second embodiment on a wet film is controlled within a range of 29.5° or more and 70.0° or less. Consequently, the brilliant pigment included in the brilliant layer is appropriately oriented such that relationships of $L1 \geq 200$, $L2 \geq 100$, and $L1 - L2 \geq 90$ are given, and good metallic gloss can be provided to the adherend.

<2-4. Manufacturing Method of Printed Matter>

The recording method by discharging the ink composition according to the second embodiment onto a surface of a substrate can also be defined as a manufacturing method of a printed matter.

The contact angle of the ink composition according to the second embodiment on a wet film is controlled within a range of 29.5° or more and 70.0° or less. Consequently, the brilliant pigment included in the brilliant layer is appropriately oriented such that relationships of $L1 \geq 200$, $L2 \geq 100$, and $L1 - L2 \geq 90$ are given, and a printed matter having good metallic gloss can be obtained as a result.

EXAMPLES

The present invention will now be described in further details by examples but is not limited to these descriptions.

First Embodiment

1. Production of Brilliant Pigment (1) Brilliant Pigment 1-1

A coating liquid 1 with the following composition was uniformly applied onto a PET film having a thickness of 100 μm by a bar coating method and was dried at 60° C. for 10 minutes to form a release resin layer.

Coating Liquid 1

Cellulose acetate butyrate (butylation rate: 35% to 39%, manufactured by Kanto Chemical Co., Inc.): 3% Isopropanol: 97%

Subsequently, a metal-containing thin film having a thickness of 20 nm was formed on the release resin layer using the "VE-1010 type vacuum deposition equipment" manufactured by Vacuum Device K.K. to produce a laminate. The obtained laminate was immersed in isopropanol and simultaneously subjected to peeling, grinding, and fine dispersion for 12 hours using "VS-150 ultrasonic disperser" manufactured by As One Corporation to obtain a brilliant pigment dispersion containing a brilliant pigment (metal-containing brilliant pigment consisting of aluminum).

The obtained brilliant pigment dispersion was filtered with a SUS mesh filter with an opening of 5 μm to remove coarse particles. Subsequently, isopropanol was distilled away from the filtrate with an evaporator. Then, isopropanol was substituted with phenoxyethyl acrylate, and the concentration of the brilliant pigment was adjusted to prepare a brilliant pigment dispersion 1-1 containing 5 mass % of the brilliant pigment 1-1. This brilliant pigment 1 had a volume-based 50% cumulative particle diameter (D50) of 2.5 µm, a volume-based 90% cumulative particle diameter (D90) of 3.5 µm, and a thickness of 40 nm.

(2) Brilliant Pigment 1-2

As outlined above, a brilliant pigment dispersion was manufactured. To 200 g of the brilliant pigment dispersion, a solution prepared by dissolving 5 g of polyester resin having an acid value of 70 (Crylcoat 340, supplied from UCB S.A. of Belgium) and 5 g of an epoxy resin with an epoxy equivalent of 750 (Araldit GT6063ES, supplied from Vantico AG of Switzerland) in 100 g of acetone was added, and the mixture was stirred for 1 hour and was then applied to the above-described centrifugation and washing procedure. Acetone was substituted with phenoxyethyl acrylate to prepare a brilliant pigment dispersion 2 containing 5 mass % of a brilliant pigment 1-2 with surface protection treatment. This brilliant pigment 1-2 had a volume-based 50% cumulative particle diameter (D50) of 2.3 µm, a volume-based 90% cumulative particle diameter (D90) of 2.7 µm, and a thickness of 25 nm.

(3) Brilliant Pigment 1-3

A brilliant pigment dispersion 1-3 containing 5 mass % of a brilliant pigment 3 with surface protection treatment was prepared as in the manufacturing of the brilliant pigment 1-2 above except that the polyester resin and the epoxy resin were replaced by 1 g of stearyl stearate. This brilliant pigment 1-3 had a volume-based 50% cumulative particle diameter (D50) of 2.0 µm, a volume-based 90% cumulative particle diameter (D90) of 2.5 µm, and a thickness of 20 nm.

(4) Brilliant Pigment 1-4

A brilliant pigment dispersion 1-4 containing 5 mass % of a brilliant pigment 4 with surface protection treatment was prepared as in the manufacturing of the brilliant pigment 1-2 above except that the polyester resin and the epoxy resin were replaced by 1 g of DISPERBYK-180 (phosphoric acid group-containing dispersant, acid value: 95 mg KOH/g of additive, amine value: 95 mg KOH/g of additive; BYK Chemie GmbH) and 0.2 g of octyl sulfonate and that phenoxyethyl acrylate was replaced by 1,6-hexanediol diacrylate. This brilliant pigment 4 had a volume-based 50% cumulative particle diameter (D50) of 1.9 µm, a volume-based 90% cumulative particle diameter (D90) of 2.1 µm, and a thickness of 20 nm.

2. Manufacturing of Ink Composition

The ink composition of an experiment example was manufactured using the "brilliant pigment dispersion" above. Specifically, the brilliant pigments 1-1 to 1-4 were extracted from the brilliant pigment dispersions 1-1 to 1-4 above, and the ink compositions of Examples and Comparative Examples were each prepared using a polymerizable compound, a brilliant pigment, and a polymerization inhibitor in the proportions shown in the table below. The unit in the table is "mass %".

TABLE 1

|  |  |  | Example 1-1 | Example 1-2 | Example 1-3 | Example 1-4 | Example 1-5 | Example 1-6 | Example 1-7 |
|---|---|---|---|---|---|---|---|---|---|
| Brilliant pigment | Brilliant pigment1-1 | | 3 | 3 | 3 | 3 | 3 | 3 | 3 |
| | Brilliant pigment1-2 | | | | | | | | |
| | Brilliant pigment1-3 | | | | | | | | |
| | Brilliant pigment1-4 | | | | | | | | |
| Polymerizable compound | Phenoxyethyl acrylate | | 30.3 | 30.3 | 30.3 | 33.3 | 30.3 | 30.3 | 30.3 |
| | 1,6-Hexanediol diacrylate | | 48.7 | 53.7 | 51.7 | 53.7 | 53.7 | 53.7 | 53.7 |
| Polymerization initiator | Acylphosphine oxide-based (P1) | IRGACURE TPO | 10 | 10 | 4 | 2 | 2 | 2 | 2 |
| | | IRGACURE 819 | | | 2 | 2 | 2 | 2 | 2 |
| | Aminoacetophenone-based (P2) | IRGACURE 379 | 4 | 1.5 | 3 | 3 | | | |
| | | IRGACURE 907 | | | | | 3 | 3 | 3 |
| | Thioxanthone-based (P3) | Omnirad DETX | 4 | 1.5 | 3 | 3 | 3 | | |
| | | Omnirad ITX | | | | | | 3 | |
| | | Omnirad CTX | | | | | | | 3 |
| | Others | Speedcure EDB | | | | 3 | | 3 | |
| | | Speedcure BMS | | | | | 3 | | |
| | | Speedcure EHA | | | | | | | 3 |
| | | Speedcure MBP | | | | | | | |
| | Total amount of initiators | | 18 | 13 | 15 | 13 | 13 | 13 | 13 |
| Total | | | 100.0 | 100.0 | 100.0 | 103.0 | 100.0 | 100.0 | 100.0 |
| Total amount of each type of polymerization initiators | | P1 | 10 | 10 | 6 | 4 | 4 | 4 | 4 |
| | | P2 | 4 | 1.5 | 3 | 3 | 3 | 3 | 3 |
| | | P3 | 4 | 1.5 | 3 | 3 | 3 | 3 | 3 |
| Proportion of each polymerization initiator to the total amount of polymerization initiators | | P1/P | 56% | 77% | 40% | 31% | 31% | 31% | 31% |
| | | P2/P | 22% | 12% | 20% | 23% | 23% | 23% | 23% |
| | | P3/P | 22% | 12% | 20% | 23% | 23% | 23% | 23% |
| Evaluation | | Curability | ○ | Δ | ○ | ○ | ○ | ○ | ○ |
| | | Glossiness | Δ | Δ | Δ | ○ | ○ | ○ | ○ |
| | | Contrast | ○ | ○ | ○ | ○ | ○ | ○ | ○ |

|  |  |  | Example 1-8 | Example 1-9 | Example 1-10 | Example 1-11 | Example 1-12 | Example 1-13 | Example 1-14 |
|---|---|---|---|---|---|---|---|---|---|
| Brilliant pigment | Brilliant pigment1-1 | | | | | 3 | 3 | 3 | 2 |
| | Brilliant pigment1-2 | | 3 | | | | | | |
| | Brilliant pigment1-3 | | | 3 | | | | | |
| | Brilliant pigment1-4 | | | | 3 | | | | |
| Polymerizable compound | Phenoxyethyl acrylate | | 33.3 | 30.3 | 30.3 | 30.3 | 30.3 | 30.3 | 30.3 |
| | 1,6-Hexanediol diacrylate | | 53.7 | 53.7 | 53.7 | 55.7 | 54.7 | 54.7 | 56.7 |

TABLE 1-continued

| | | | | | | | | | |
|---|---|---|---|---|---|---|---|---|---|
| Polymerization initiator | Acylphosphine oxide-based (P1) | IRGACURE TPO | 2 | 2 | 2 | | 4 | | |
| | | IRGACURE 819 | 2 | 2 | 2 | 2 | 2 | 2 | 2 |
| | Aminoacetophenone-based (P2) | IRGACURE 379 | | | | 3 | 2 | 4 | 3 |
| | | IRGACURE 907 | 3 | 3 | 3 | | | | |
| | Thioxanthone-based (P3) | Omnirad DETX | 3 | 3 | 3 | 3 | 2 | 4 | 3 |
| | | Omnirad ITX | | | | | | | |
| | | Omnirad CTX | | | | | | | |
| | Others | Speedcure EDB | | 3 | | 3 | | | 3 |
| | | Speedcure BMS | | | 3 | | 2 | 2 | |
| | | Speedcure EHA | | | | | | | |
| | | Speedcure MBP | 3 | | | | | | |
| | Total amount of initiators | | 13 | 13 | 13 | 11 | 12 | 12 | 11 |
| Total | | | 103.0 | 100.0 | 100.0 | 100.0 | 100.0 | 100.0 | 100.0 |
| Total amount of each type of polymerization initiators | P1 | | 4 | 4 | 4 | 2 | 6 | 2 | 2 |
| | P2 | | 3 | 3 | 3 | 3 | 2 | 4 | 3 |
| | P3 | | 3 | 3 | 3 | 3 | 2 | 4 | 3 |
| Proportion of each polymerization initiator to the total amount of polymerization initiators | P1/P | | 31% | 31% | 31% | 18% | 50% | 17% | 18% |
| | P2/P | | 23% | 23% | 23% | 27% | 17% | 33% | 27% |
| | P3/P | | 23% | 23% | 23% | 27% | 17% | 33% | 27% |
| Evaluation | Curability | | ○ | ○ | ○ | ○ | ○ | ○ | ○ |
| | Glossiness | | ○ | ○ | ○ | ○ | Δ | ○ | ○ |
| | Contrast | | ○ | ○ | ○ | ○ | ○ | ○ | ○ |

| | | | Example 1-15 | Example 1-16 | Example 1-17 | Comparative Example 1-1 | Comparative Example 1-2 |
|---|---|---|---|---|---|---|---|
| Brilliant pigment | Brilliant pigment1-1 | | 2 | 1.5 | 1.5 | 3 | 3 |
| | Brilliant pigment1-2 | | | | | | |
| | Brilliant pigment1-3 | | | | | | |
| | Brilliant pigment1-4 | | | | | | |
| Polymerizable compound | Phenoxyethyl acrylate | | 30.3 | 30.5 | 30.3 | 30.3 | 30.3 |
| | 1,6-Hexanediol diacrylate | | 49.7 | 50 | 57.2 | 56.7 | 57.7 |
| Polymerization initiator | Acylphosphine oxide-based (P1) | IRGACURE TPO | 10 | 10 | | 10 | |
| | | IRGACURE 819 | | | 2 | | |
| | Aminoacetophenone-based (P2) | IRGACURE 379 | 4 | 4 | 3 | | 3 |
| | | IRGACURE 907 | | | | | |
| | Thioxanthone-based (P3) | Omnirad DETX | 4 | 4 | 3 | | 3 |
| | | Omnirad ITX | | | | | |
| | | Omnirad CTX | | | | | |
| | Others | Speedcure EDB | | | | 3 | |
| | | Speedcure BMS | | | | | 3 |
| | | Speedcure EHA | | | | | |
| | | Speedcure MBP | | | | | |
| | Total amount of initiators | | 18 | 18 | 11 | 10 | 9 |
| Total | | | 100.0 | 100.0 | 100.0 | 100.0 | 100.0 |
| Total amount of each type of polymerization initiators | P1 | | 10 | 10 | 2 | 10 | 0 |
| | P2 | | 4 | 4 | 3 | 0 | 3 |
| | P3 | | 4 | 4 | 3 | 0 | 3 |
| Proportion of each polymerization initiator to the total amount of polymerization initiators | P1/P | | 56% | 56% | 18% | 100% | 0% |
| | P2/P | | 22% | 22% | 27% | 0% | 33% |
| | P3/P | | 22% | 22% | 27% | 0% | 33% |
| Evaluation | Curability | | ○ | ○ | ○ | x | x |
| | Glossiness | | Δ | Δ | Δ | ○ | ○ |
| | Contrast | | ○ | Δ | Δ | ○ | ○ |

| | | | Comparative Example 1-3 | Comparative Example 1-4 | Comparative Example 1-5 | Comparative Example 1-6 | Comparative Example 1-7 |
|---|---|---|---|---|---|---|---|
| Brilliant pigment | Brilliant pigment1-1 | | 3 | 3 | 1 | 2 | 2 |
| | Brilliant pigment1-2 | | | | | | |
| | Brilliant pigment1-3 | | | | | | |
| | Brilliant pigment1-4 | | | | | | |
| Polymerizable compound | Phenoxyethyl acrylate | | 30.3 | 30.3 | 30.3 | 38 | 38 |
| | 1,6-Hexanediol diacrylate | | 52.7 | 52.7 | 58.7 | 50 | 50 |
| Polymerization initiator | Acylphosphine oxide-based (P1) | IRGACURE TPO | 10 | 10 | 10 | 10 | 10 |
| | | IRGACURE 819 | | | | | |
| | Aminoacetophenone-based (P2) | IRGACURE 379 | 4 | | | | |
| | | IRGACURE 907 | | | | | |
| | Thioxanthone-based (P3) | Omnirad DETX | | 4 | | | |
| | | Omnirad ITX | | | | | |
| | | Omnirad CTX | | | | | |

TABLE 1-continued

| | | | | | | |
|---|---|---|---|---|---|---|
| Others | Speedcure EDB | | | | | |
| | Speedcure BMS | | | | | |
| | Speedcure EHA | | | | | |
| | Speedcure MBP | | | | | |
| Total amount of initiators | | 14 | 14 | 10 | 10 | 10 |
| Total | | 100.0 | 100.0 | 100.0 | 100.0 | 100.0 |
| Total amount of each type of polymerization initiators | P1 | 10 | 10 | 10 | 10 | 10 |
| | P2 | 4 | 0 | 0 | 0 | 0 |
| | P3 | 0 | 4 | 0 | 0 | 0 |
| Proportion of each polymerization initiator to the total amount of polymerization initiators | P1/P | 71% | 71% | 100% | 100% | 100% |
| | P2/P | 29% | 0% | 0% | 0% | 0% |
| | P3/P | 0% | 29% | 0% | 0% | 0% |
| Evaluation | Curability | x | x | ○ | x | x |
| | Glossiness | ○ | ○ | Δ | ○ | ○ |
| | Contrast | ○ | ○ | x | ○ | ○ |

In the table, "IRGACURE TPO" is 2,4,6-trimethylbenzoyl-diphenyl-phosphine oxide (a polymerization initiator manufactured by BASF SE, corresponding to "acylphosphine oxide-based photopolymerization initiator").

In the table, "IRGACURE 819" is bis(2,4,6-trimethylbenzoyl)-phenylphosphine oxide (a polymerization initiator manufactured by BASF SE, corresponding to "acylphosphine oxide-based photopolymerization initiator").

In the table, "IRGACURE 379" is 2-(dimethylamino)-2-[(4-methylphenyl)methyl]-1-[4-(4-morpholinyl)phenyl]-1-butanone (a polymerization initiator manufactured by BASF SE, corresponding to "aminoacetophenone-based polymerization initiator").

In the table, "IRGACURE 907" is 2-methyl-1-[4-(methylthio)phenyl]-2-morpholinopropan-1-one (a polymerization initiator manufactured by BASF SE, corresponding to "aminoacetophenone-based polymerization initiator").

In the table, "Omnirad DETX" is 2,4-diethylthioxanthone (a polymerization initiator manufactured by IGM Resins, corresponding to "thioxanthone-based polymerization initiator").

In the table, "Omnirad ITX" is 2-isopropylthioxanthone (a polymerization initiator manufactured by IGM Resins, corresponding to "thioxanthone-based polymerization initiator").

In the table, "Omnirad CTX" is 2-chlorothioxanthone (a polymerization initiator manufactured by IGM Resins, corresponding to "thioxanthone-based polymerization initiator").

In the table, "Speedcure EDB" is ethyl-4-(dimethylamino)benzoate (a polymerization initiator manufactured by Lambson Limited).

In the table, "Speedcure BMS" is 4-benzoyl-4'-methyldiphenyl sulfide (a polymerization initiator manufactured by Lambson Limited).

In the table, "Speedcure EHA" is 2-ethylhexyl-4-(dimethylamino)benzoate (a polymerization initiator manufactured by Lambson Limited).

In the table, "Speedcure MBP" is 4-methylbenzophenone (a polymerization initiator manufactured by Lambson Limited).

3. Evaluation (1) Curability Evaluation

The curability of the brilliant layer in each of the printed matters, obtained using the ink compositions of Examples and Comparative Examples was evaluated. Specifically, the ink compositions of Examples and Comparative Examples were each discharged to a surface of a recording medium (PET film, (TOYOBO Co., Ltd., COSMOSHINE A4360)) with an inkjet recording apparatus (manufactured by FUJIFILM Corporation, "Material printer DMP-2850") and was irradiated with active energy rays with a peak illumination of 250 mW/cm 2 and an integrated light intensity of 650 mW/cm 2 by an LED lamp with a wavelength of 385 nm to manufacture each printed matter. The curability was verified by touching the brilliant layer of each of the obtained printed matters with a finger.

Evaluation Criteria

Good (indicated by circle symbol (o)): There was no stickiness, and curability was good.

Fair (indicated by triangle symbol (Δ)): There was some tack immediately after printing.

Poor (indicated by cross symbol (x)): The tack was strong, and curing was poor.

and Δ are within tolerance for actual use.

(2) Glossiness Evaluation

Glossiness of the printed matters obtained using the non-aqueous ink compositions of Examples and Comparative Examples was evaluated. Specifically, as shown in FIG. 1, incident light was allowed to be incident on the brilliant layer of each of the above-obtained printed matters at an incidence angle of 45°, with respect to the printed surface using a multi-angle colorimeter CM-M6 manufactured by KONICA MINOLTA, Inc., the L* (lightness index) in the L*a*b* color system was measured at a measurement angle that is the angle changed by 15° from the reflection angle with respect to the incidence angle to the normal direction, and the glossiness (in the table, written as "Glossiness") was evaluated based on the following evaluation criteria.

Good (indicated by circle symbol (o)): the L* value was 130 or more.

Fair (indicated by triangle symbol (A)): the L* value was 110 or more and less than 130.

Poor (indicated by cross symbol (x)): the L* value was less than 110.

o and Δ are within tolerance for actual use.

(3) Contrast Property Evaluation

The contrast properties of each of the printed matters obtained using the ink compositions of Examples and Comparative Examples were evaluated. Specifically, the ink compositions of Examples and Comparative Examples were discharged onto the surface of contrast rate test paper with an inkjet recording apparatus and were irradiated with active energy rays to be cured, and the tristimulus values Y in the white and black areas were measured to determine each contrast rate. The hiding rate (in the table, written as "Contrast") was evaluated by the following evaluation criteria.

Evaluation Criteria

Good (indicated by circle symbol (o)): the contrast rate is 95% or more.

Fair (indicated by triangle symbol (A)): the contrast rate is 80% or more and less than 95%.

Poor (indicated by cross symbol (x)): the contrast rate is less than 80%.

and Δ are within tolerance for actual use.

As indicated from the table above, it is demonstrated that the ink compositions of Examples containing an acylphosphine oxide-based polymerization initiator, an aminoacetophenone-based polymerization initiator, and a thioxanthone-based polymerization initiator can improve the curability while maintaining the glossiness.

In particular, in Examples 1-4 to 1-11, 1-13, and 1-14 in which the content of the brilliant pigment is 1.5 mass % or more with respect to the total amount of the ink composition and the content of the acylphosphine oxide-based polymerization initiator is 10 mass % or more and 39 mass % or less with respect to the total amount of the polymerization initiators, the balance between glossiness and curability was particularly good.

In contrast, in the ink compositions of Comparative Examples 1-1 to 1-4, 1-6, and 1-7 not containing all of three polymerization initiators: the acylphosphine oxide-based polymerization initiator, the aminoacetophenone-based polymerization initiator, and the thioxanthone-based polymerization initiator, the curability deteriorated, or the glossiness was not maintained. In Comparative Example 1-5 in which the content of the brilliant pigment was in a proportion of less than 1.5 mass % with respect to the total amount of the ink composition, although the curability was good, the glossiness and contrasting properties were insufficient.

Second Embodiment

1. Production of Brilliant Pigment
(1) Brilliant Pigment 2-1

A coating liquid 1, having the following composition, was uniformly applied onto a PET film having a thickness of 100 μm by a bar coating method and was dried at 60° C. for 10 minutes to form a release resin layer.

Coating Liquid 1

Cellulose acetate butyrate (butylation rate: 35% to 39%, manufactured by Kanto Chemical Co., Inc.): 3%
Isopropanol: 97%

Subsequently, a metal-containing thin film having a thickness of 20 nm was formed on the release resin layer using "VE-1010 type vacuum deposition equipment" manufactured by Vacuum Device K.K. to produce a laminate. The obtained laminate was immersed in diisopropanol and simultaneously subjected to peeling, grinding, and fine dispersion for 12 hours using "VS-150 ultrasonic disperser" manufactured by As One Corporation to obtain a brilliant pigment dispersion containing a brilliant pigment (metal-containing brilliant pigment consisting of aluminum).

The obtained brilliant pigment dispersion was filtered with a SUS mesh filter with an opening of 5 μm to remove coarse particles. Subsequently, isopropanol was distilled away from the filtrate with an evaporator. Then, isopropanol was substituted with phenoxyethyl acrylate, and the concentration of the brilliant pigment was adjusted to prepare a brilliant pigment dispersion containing 5 mass % of the brilliant pigment. This brilliant pigment had a volume-based 50% cumulative particle diameter (D50) of 2.5 μm, a volume-based 90% cumulative particle diameter (D90) of 3.5 μm, and a thickness of 40 nm.

2. Manufacturing of Ink Composition

The ink composition of an experiment example was manufactured using the "brilliant pigment dispersion" above. Specifically, the ink compositions of Examples and Comparative Examples were prepared using the above-mentioned brilliant pigment dispersion, polymerizable compound, and brilliant pigment in the proportions shown in the table below. The unit is mass %.

TABLE 2

|  |  |  | Example 2-1 | Example 2-2 | Example 2-3 | Example 2-4 | Example 2-5 | Example 2-6 | Example 2-7 |
|---|---|---|---|---|---|---|---|---|---|
| Pigment | Brilliant metal pigment | | 3 | 1 | 3 | 3 | 3 | 3 | 5 |
| Polymerizable compound (Surface tension) | Phenoxyethyl acrylate (39.2) | | 87 | 79 | 57 | 57 | 37 | 57 | 55 |
| | Isobornyl acrylate (30.7) | | | | | 30 | | | |
| | t-Butylcyclohexyl acrylate (29.6) | | | | | | | | |
| | Neopentyl acrylate (31.5) | | | | | | 30 | | |
| | Dipropylene glycol diacrylate (32.5) | | | | | | | | |
| | 1,6-Hexanediol diacrylate (35.1) | | | 10 | | | 50 | 30 | 30 |
| | Cyclic trimethylolpropane formal acrylate (33.1) | | | | | | | | |
| Polymerization initiator | Acylphosphine oxide | IRGACURE TPO | 10 | 10 | 10 | 10 | 10 | 10 | 10 |
| | | IRGACURE 819 | | | | | | | |
| | Aminoacetophenone | IRGACURE 379 | | | | | | | |
| | Thioxanthone | Omnirad DETX | | | | | | | |
| | Aminobenzoate | Speedcure EDB | | | | | | | |
| Total | | | 100.0 | 100.0 | 100.0 | 100.0 | 100.0 | 100.0 | 100.0 |
| Evaluation | $L^*$ | Reflection angle −15° | 130.9 | 117.71 | 113.07 | 115.14 | 140.92 | 142.63 | 155.065 |
| | | 15° | 107.79 | 94.41 | 95.19 | 95.15 | 116.06 | 117.03 | 122.91 |
| | | 25° | 82.87 | 72.42 | 73.04 | 70.92 | 78.87 | 78.71 | 87.47 |
| | | 45° | 50.65 | 45.88 | 50.11 | 49.25 | 47.79 | 47.55 | 51.80 |
| | | 75° | 35.39 | 30.83 | 35.34 | 37.24 | 34.62 | 34.57 | 36.40 |
| | | 110° | 29.21 | 27.12 | 28.44 | 30.61 | 28.83 | 28.61 | 31.09 |
| | L1 | | 238.69 | 212.12 | 208.26 | 210.29 | 256.98 | 259.66 | 277.975 |
| | L2 | | 115.25 | 103.83 | 113.89 | 117.1 | 111.24 | 110.73 | 119.29 |
| | L1 − L2 | | 123.44 | 108.29 | 94.37 | 93.19 | 145.74 | 148.93 | 158.685 |

TABLE 2-continued

|  |  | | | | | | |
|---|---|---|---|---|---|---|---|
| Contact angle[°] | 45.5 | 43.9 | 33.5 | 31.0 | 35.8 | 36.8 | 36.6 |
| Surface tension (measured value)[mN/m] | 39.2 | 38.7 | 36.3 | 36.5 | 36.8 | 37.8 | 37.8 |
| Glossiness | ○ | Δ | Δ | Δ | ○ | ○ | ○ |
| Whiteness | ○ | ○ | ○ | ○ | ○ | ○ | ○ |

| | | | | Example 2-8 | Example 2-9 | Example 2-10 | Comparative Example 2-1 | Comparative Example 2-2 | Comparative Example 2-3 | Comparative Example 2-4 |
|---|---|---|---|---|---|---|---|---|---|---|
| Pigment | Brilliant metal pigment | | | 3 | 3 | 3 | 3 | 3 | 1.5 | 0.5 |
| Polymerizable compound (Surface tension) | Phenoxyethyl acrylate (39.2) | | | 56 | 71 | 71 | 30.4 | 30.4 | 20.5 | 39.5 |
| | Isobornyl acrylate (30.7) | | | | | | | 56.6 | | |
| | t-Butylcyclohexyl acrylate (29.6) | | | | | | 56.6 | | | |
| | Neopentyl acrylate (31.5) | | | | | | | | | |
| | Dipropylene glycol diacrylate (32.5) | | | | | | | | 30 | |
| | 1,6-Hexanediol diacrylate (35.1) | | | 30 | 15 | | | | 30 | 50 |
| | Cyclic trimethylolpropane formal acrylate (33.1) | | | | | 15 | | | | |
| Polymerization initiator | Acylphosphine oxide | IRGACURE TPO | | | | | 10 | 10 | 10 | 10 |
| | | IRGACURE 819 | | 2 | 2 | 2 | | | | |
| | Aminoacetophenone | IRGACURE 379 | | 3 | 3 | 3 | | | 4 | |
| | Thioxanthone | Omnirad DETX | | 3 | 3 | 3 | | | 4 | |
| | Aminobenzoate | Speedcure EDB | | 3 | 3 | 3 | | | | |
| Total | | | | 100.0 | 100.0 | 100.0 | 100.0 | 100.0 | 100.0 | 100.0 |
| Evaluation | L* | Reflection angle | −15° | 129.82 | 136.06 | 144.99 | 107.18 | 96.46 | 103.55 | 98.18 |
| | | | 15° | 105 | 109.85 | 123.25 | 89.49 | 80.54 | 82.67 | 79.28 |
| | | | 25° | 74.45 | 80.37 | 84.86 | 70.99 | 62.47 | 63.45 | 60.38 |
| | | | 45° | 47.65 | 49.06 | 49.32 | 52.82 | 44.90 | 46.95 | 43.47 |
| | | | 75° | 36.05 | 35.15 | 33.69 | 38.73 | 30.92 | 38.56 | 27.04 |
| | | | 110° | 29.84 | 29.17 | 28.19 | 31.05 | 26.39 | 32.08 | 26.17 |
| | L1 | | | 234.82 | 245.91 | 268.24 | 196.67 | 177.00 | 186.22 | 177.46 |
| | L2 | | | 113.54 | 113.38 | 111.2 | 122.6 | 102.21 | 117.59 | 96.68 |
| | L1 − L2 | | | 121.28 | 132.53 | 157.04 | 74.07 | 74.79 | 68.63 | 80.78 |
| | Contact angle[°] | | | 36.8 | 41.2 | 43.3 | 23.4 | 25.5 | 29.1 | 36.2 |
| | Surface tension (measured value)[mN/m] | | | 37.8 | 38.5 | 37.7 | 33.0 | 33.7 | 35.2 | 36.9 |
| | Glossiness | | | ○ | ○ | ○ | x | x | x | x |
| | Whiteness | | | ○ | ○ | ○ | ○ | ○ | ○ | x |

3. Evaluation (1) Calculation of L1 and L2 Values

The L* value of each of the printed matters, obtained using the ink compositions of the Examples and Comparative Examples was determined at each reflection angle to calculate the L1 and L2 values. Specifically, the ink compositions of the Examples and the Comparative Examples were each discharged to a surface of a PET film (TOYOBO Co., Ltd., COSMOSHINE A4360) with an inkjet recording apparatus, "Material printer DMP-2850", manufactured by FUJIFILM Corporation, and was irradiated with active energy rays having a wavelength of 385 nm using an LED lamp to manufacture each printed matter. When incident light was incident on the brilliant layer of each of the obtained printed matters at an incidence angle of 45°, using a multi-angle colorimeter CM-M6 manufactured by KONICA MINOLTA, Inc., wherein when the angle of specular reflection light in response to the incident light and the angle of a normal line with respect to the brilliant layer were defined as 0° and 45°, respectively, L* (lightness index) in the L*a*b* color system was measured at each of reflection angles of −15°, 15°, 25°, 45°, 75°, and 110°, and the total L1 of the L* values regarding the reflection angle of −15° and the reflection angle of 15° and the total L2 of the L* values regarding the reflection angle of 45°, the reflection angle of 75°, the reflection angle of 110° were calculated.

(3) Surface Tension

The surface tension of each polymerizable monomer included in the ink compositions of Examples and Comparative Examples was measured at a measurement temperature of 25° C. by a Wilhelmy method (DY-300, manufactured by Kyowa Interface Science Co., Ltd.). The calculated value N of the surface tension was determined based on the weight average of the ink composition by the following calculation equation:

$$N = \sum_{i=1}^{n} \frac{m_i}{M} \times N_i \quad \text{[Math 1]}$$

In the equation, Ni means the surface tension of each polymerizable compound, n means the type of each polymerizable compound, M means the total amount of the polymerizable compounds in the ink composition, and mi means the weight of each polymerizable compound.

(4) Measurement of Contact Angle

The contact angles of the ink compositions of Examples and Comparative Examples on a wet film were determined. Specifically, the ink compositions of Examples and Comparative Examples were each applied onto a PET film (TOYOBO Co., Ltd. COSMOSHINE A4360) at a condition of 25° C. in an uncured wet film state using an automatic contact angle measuring instrument ("Dropmaster SA-301" manufactured by Kyowa Interface Science Co., Ltd.), 2.0 µL of a droplet of each of the ink compositions of Examples and Comparative Examples was allowed to adhere onto the wet film, and the contact angle after 100 ms (in the table, written as "Contact angle") was determined.

(5) Glossiness Evaluation

The metallic gloss (metallic feeling) of each of the printed matters obtained using the ink compositions of Examples and Comparative Examples was evaluated. Specifically, the printed matters obtained above were visually verified for the metallic feeling (in the table, written as "Glossiness").

Evaluation Criteria
- Good (indicated by circle symbol (o)): the appearance has excellent metal-tone gloss.
- Fair (indicated by triangle symbol (A)): the appearance has metal-tone gloss.
- Poor (indicated by cross symbol (x)): the appearance does not have metal-tone gloss.
- and Δ are within tolerance for actual use.

(6) Whiteness

The whiteness of each of the printed matters obtained using the ink compositions of Examples and Comparative Examples was evaluated. Specifically, the printed matters obtained above were visually verified for the whiteness (in the table, written as "Whiteness").

Evaluation Criteria
- Good (indicated by circle symbol (o)): the appearance has excellent whiteness.
- Fair (indicated by triangle symbol (A)): the appearance has whiteness that does not cause any practical problem.
- Poor (indicated by cross symbol (x)): the appearance is tinged with gray.
- and Δ are within tolerance for actual use.

As obvious from the table above, it is demonstrated that printed matters obtained using the ink compositions of Examples satisfying the relationships of L1≥200, L2≥100, and L1− L2≥90 are printed matters being good in the metallic feeling and whiteness and having good metallic gloss.

In each of the ink compositions of Examples, the content of the brilliant pigment was 1.0 mass % or more with respect to the total amount of the ink composition, and the contact angle of each ink composition on a wet film was 29.5° or more and 70.0° or less. This demonstrates that when the content of the brilliant pigment is 1.0 mass % or more with respect to the total amount of the ink composition and the contact angle of the ink composition on a wet film is 29.5° or more and 70.0° or less, the brilliant pigment included in the brilliant layer is appropriately oriented to give a printed mater satisfying the relationships of L1≥200, L2≥100, and L1− L2≥90.

Figure 2:
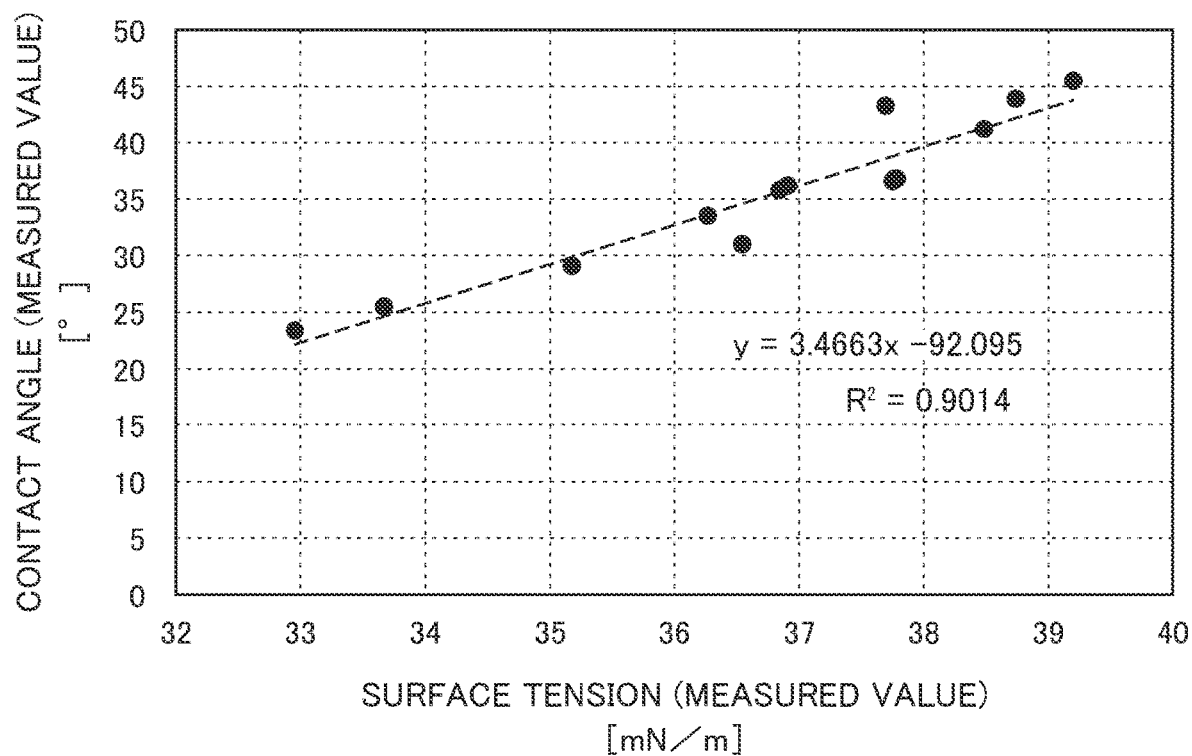
FIG. 2 is a linear approximation expressing a correlation between calculated values (X coordinate) of surface tension and measured values (Y coordinate) of contact angles in ink compositions.

FIG. 2 shows a linear approximation line expressing the correlation between the calculated value (X coordinate) of surface tension and the measured value (Y coordinate) of contact angle in ink compositions. The determined square $R^2$ of the correlation coefficient of this linear approximation line was 0.90. This demonstrates that there is a correlation between the calculated value of the surface tension of an ink composition determined from the surface tension of each polymerizable compound, and the contact angle of the ink composition on a wet film. Based on an approximation equation obtained by plotting the calculated value of the surface tension with respect to the contact angle of the ink composition on a wet film, an ink composition having a contact angle of 29.5° or more and 70.0° or less, on a wet film, can be obtained by selecting the type and content of each polymerizable compound such that the contact angle on a wet film is 29.5° or more and 70.0° or less.

Based on this, a person skilled in the art in contact with the present specification can easily obtain an ink composition having a contact angle of 29.5° or more and 70.0° or less on a wet film, and can easily implement not only the ink compositions having compositions of Examples but also ink compositions obtained by appropriately changing the types and contents of polymerization compounds from those of the ink compositions having compositions of Examples.

EXPLANATION OF REFERENCE NUMERALS

1 printed matter

The invention claimed is:

1. An active energy ray curable ink composition to be discharged by an inkjet method, the ink composition comprising:
   polymerization initiators, a polymerizable compound, and a brilliant pigment,
   a content of the brilliant pigment being 1.5 mass % or more with respect to the total amount of the ink composition,
   a content of the polymerization initiators being 10 mass % or more with respect to the total amount of the ink composition,
   the polymerization initiators comprising an acylphosphine oxide-based polymerization initiator, and an aminoacetophenone-based polymerization initiator, and a thioxanthone-based polymerization initiator.

2. The ink composition according to claim 1, wherein
   a content of the acylphosphine oxide-based polymerization initiator is 10 mass % or more and 80 mass % or less with respect to the total amount of the polymerization initiators,
   a content of the aminoacetophenone-based polymerization initiator is 5 mass % or more and 50 mass % or less with respect to the total amount of the polymerization initiators, and
   a content of the thioxanthone-based polymerization initiator is 5 mass % or more and 50 mass % or less with respect to the total amount of the polymerization initiators.

3. The ink composition according to claim 2, wherein
   the content of the acylphosphine oxide-based polymerization initiator is 10 mass % or more and 39 mass % or less with respect to the total amount of the polymerization initiators.

4. The ink composition according to claim 1, wherein
   the brilliant pigment includes a metal-containing brilliant pigment.

5. A recording method, comprising discharging an active energy ray curable ink composition by an inkjet method,
   the ink composition comprising polymerization initiators, a polymerizable compound, and a brilliant pigment,
   a content of the brilliant pigment being 1.5 mass % or more,
   a content of the polymerization initiators being 10 mass % or more with respect to the total amount of the ink composition, and
   the polymerization initiators comprising an acylphosphine oxide-based polymerization initiator, an aminoacetophenone-based polymerization initiator, and a thioxanthone-based polymerization initiator.

6. A manufacturing method of a printed matter, comprising discharging an active energy ray curable ink composition by an inkjet method,
   the ink composition comprising polymerization initiators, a polymerizable compound, and a brilliant pigment,
   a content of the brilliant pigment being 1.5% or more, a content of the polymerization initiators being 10 mass % or more with respect to the total amount of the ink composition, the polymerization initiators comprising an acylphosphine oxide-based polymerization initiator, an aminoacetophenone-based polymerization initiator, and a thioxanthone-based polymerization initiator.

7. A printed matter comprising a brilliant layer containing a brilliant pigment, wherein when incident light is incident on the brilliant layer at an incidence angle of with respect to the brilliant layer of the printed matter, L1, a total of L* values regarding a reflection angle of −15° and a reflection angle of 15° in the L*a*b* color system, is 200 or more, L2, a total of L* values regarding a reflection angle of 45°, a reflection angle of 75°, and a reflection angle of 110° in the L*a*b* color system, is 100 or more, and L1−L2 is 90 or more, provided that an angle of specular reflection light in response to the incident light and an angle of a normal line with respect to the brilliant layer are defined as 0° and 45°, respectively.

8. An active energy ray curable ink composition to be discharged by an inkjet method, the ink composition comprising:

a polymerizable compound and a brilliant pigment, a content of the brilliant pigment being 1.0 mass % or more with respect to the total amount of the ink composition, and the ink composition having a contact angle of 29.5° or more and 70.0° or less on a wet film of the ink composition.

9. The ink composition according to claim 8, wherein
the brilliant pigment comprises a metal-containing brilliant pigment.

10. The ink composition according to claim 9, wherein
the metal-containing brilliant pigment has a volume-based 50% cumulative particle diameter (D50) of 0.01 µm or more and 3.0 µm or less,
the metal-containing brilliant pigment has a volume-based 90% cumulative particle diameter (D90) of 4.5 µm or less, and
the metal-containing brilliant pigment has a thickness of 10 nm or more and 1.0 µm or less.

11. A recording method, comprising discharging the ink composition according to claim 8 by an inkjet method.

12. A manufacturing method of a printed matter, comprising discharging the ink composition according to claim 8 by an inkjet method.

13. The ink composition according to claim 2, wherein
the brilliant pigment includes a metal-containing brilliant pigment.

14. A recording method, comprising discharging the ink composition according to claim 9 by an inkjet method.

15. A manufacturing method of a printed matter, comprising discharging the ink composition according to claim 9 by an inkjet method.

16. The ink composition according to claim 3, wherein
the brilliant pigment includes a metal-containing brilliant pigment.

17. A recording method, comprising discharging the ink composition according to claim 10 by an inkjet method.

18. A manufacturing method of a printed matter, comprising discharging the ink composition according to claim 10 by an inkjet method.

* * * * *